(12) United States Patent
Langer

(10) Patent No.: US 12,095,658 B2
(45) Date of Patent: Sep. 17, 2024

(54) SYSTEMS AND METHODS FOR CLIENT-SERVER CONNECTION ABSTRACTION IN A SERVER COMPUTING ENVIRONMENT

(71) Applicant: ORACLE INTERNATIONAL CORPORATION, Redwood Shores, CA (US)

(72) Inventor: Tomas Langer, Prague (CZ)

(73) Assignee: ORACLE INTERNATIONAL CORPORATION, Redwood Shores, CA (US)

(*) Notice: Subject to any disclaimer, the term of this patent is extended or adjusted under 35 U.S.C. 154(b) by 0 days.

(21) Appl. No.: 18/198,762

(22) Filed: May 17, 2023

(65) Prior Publication Data

US 2023/0376236 A1    Nov. 23, 2023

Related U.S. Application Data

(60) Provisional application No. 63/392,039, filed on Jul. 25, 2022, provisional application No. 63/343,934, filed on May 19, 2022.

(51) Int. Cl.
*G06F 12/00* (2006.01)
*G06F 3/06* (2006.01)
(Continued)

(52) U.S. Cl.
CPC .......... *H04L 45/306* (2013.01); *G06F 3/0604* (2013.01); *G06F 3/0655* (2013.01);
(Continued)

(58) Field of Classification Search
CPC ..... H04L 45/306; H04L 67/02; H04L 67/141; H04L 67/147; G06F 8/60; G06F 9/455
See application file for complete search history.

(56) References Cited

U.S. PATENT DOCUMENTS 7,286,479 B2    10/2007    Bragg
7,644,165 B2    1/2010    Bessis
(Continued)

FOREIGN PATENT DOCUMENTS

CN    110047268    7/2019
CN    112769700    5/2021
(Continued)

OTHER PUBLICATIONS

European Patent Office, International Searching Authority, Notification of Transmittal of the International Search Report and the Written Opinion of the International Searching Authority, or the Declaration dated Nov. 20, 2023 for International Application No. PCT/US2023/022765 , 24 pages.

(Continued)

*Primary Examiner* — Shawn X Gu
(74) *Attorney, Agent, or Firm* — TUCKER ELLIS LLP

(57) ABSTRACT

In accordance with an embodiment, described herein are systems and methods for use with a microservices or other computing environment, including a web server together with related libraries and features usable to build cloud-native applications or services. To support testing of software applications or services, a client connection can be replaced with an in-memory implementation that exposes inverse functions to a server connection; for example, data bytes written to a data writer of a client connection are available through a data reader on a server connection, and vice versa. During testing, the in-memory implementation uses a blocking queue in memory, but without using actual sockets. Once the testing has been completed using the in-memory implementation, the client and/or server code can be tested against actual sockets, for use in processing a request.

15 Claims, 28 Drawing Sheets

(51) Int. Cl.
  *G06F 8/60* (2018.01)
  *H04L 45/302* (2022.01)
  *H04L 67/02* (2022.01)
  *H04L 67/141* (2022.01)
  *H04L 67/147* (2022.01)

(52) U.S. Cl.
  CPC ............... *G06F 3/067* (2013.01); *G06F 8/60* (2013.01); *H04L 67/02* (2013.01); *H04L 67/141* (2013.01); *H04L 67/147* (2013.01)

(56) References Cited

U.S. PATENT DOCUMENTS

| | | | |
|---|---|---|---|
| 9,054,943 | B2 | 6/2015 | Yengalasetti |
| 9,143,570 | B2 | 9/2015 | Khan |
| 9,172,706 | B2 | 10/2015 | Krishnamurthy |
| 9,558,067 | B2 | 1/2017 | Resch |
| 9,886,315 | B2 | 2/2018 | Lee |
| 10,237,176 | B2 | 3/2019 | Mutnuru |
| 10,331,418 | B2 | 6/2019 | Wood |
| 11,057,380 | B2 | 7/2021 | McKegney |
| 11,283,774 | B2 | 3/2022 | Anderson |
| 11,310,719 | B1 | 4/2022 | Boschulte |
| 11,748,162 | B2 | 9/2023 | Fong |
| 11,822,574 | B2 | 11/2023 | Cooper |
| 2003/0012145 | A1 | 1/2003 | Bragg |
| 2006/0268857 | A1* | 11/2006 | Bessis ............... H04L 49/90 370/389 |
| 2011/0126290 | A1 | 5/2011 | Krishnamurthy |
| 2011/0153827 | A1 | 6/2011 | Yengalasetti |
| 2011/0164527 | A1 | 7/2011 | Mishra |
| 2011/0276619 | A1 | 11/2011 | Khan |
| 2012/0054765 | A1 | 3/2012 | Lee |
| 2014/0052548 | A1 | 2/2014 | Dokken, Jr. |
| 2014/0053250 | A1 | 2/2014 | Wethington |
| 2014/0195846 | A1 | 7/2014 | Resch |
| 2017/0161028 | A1 | 6/2017 | Wood |
| 2017/0359317 | A1 | 12/2017 | Anderson |
| 2018/0006935 | A1 | 1/2018 | Mutnuru |
| 2018/0198878 | A1 | 7/2018 | Keldenich |
| 2019/0043501 | A1 | 2/2019 | Ramaci |
| 2020/0110761 | A1 | 4/2020 | Cooper |
| 2020/0396220 | A1 | 12/2020 | McKegney |
| 2021/0208941 | A1 | 7/2021 | Fong |
| 2021/0248574 | A1 | 8/2021 | Towle |
| 2023/0106840 | A1 | 4/2023 | Lin |
| 2023/0376236 | A1 | 11/2023 | Langer |
| 2023/0379242 | A1 | 11/2023 | Langer |
| 2023/0379387 | A1 | 11/2023 | Langer |
| 2023/0379391 | A1 | 11/2023 | Langer |

FOREIGN PATENT DOCUMENTS

| | | |
|---|---|---|
| CN | 112995269 | 6/2021 |
| WO | 2013163199 | 10/2013 |
| WO | 2017070545 | 4/2017 |
| WO | 2020104999 | 5/2020 |

OTHER PUBLICATIONS

United States Patent and Trademark Office, Office Communication dated Sep. 14, 2023 for U.S. Appl. No. 18/198,764 , 11 pages.

United States Patent and Trademark Office, Office Communication dated Sep. 20, 2023 for U.S. Appl. No. 18/198,765 , 8 pages.

Steinbrecher, Lukas : "A first look into the Project Loom in Java", Jul. 25, 2020, 4 pages, <https://lukstei.com/2020-07-25-a-first-look-into-the-project-loom-in-java/#:~:text=The%20Project%20Loom%20is%20a,request%20to%20process%20the%20request>.

United States Patent and Trademark Office, Office Communication dated Apr. 10, 2024 for U.S. Appl. No. 18/198,759 , 6 pages.

United States Patent and Trademark Office, Notice of Allowance and Fee(s) Due dated Apr. 5, 2024 for U.S. Appl. No. 18/198,764 , 5 pages.

United States Patent and Trademark Office, Office Communication dated Dec. 22, 2023 for U.S. Appl. No. 18/198,759 , 11 pages.

United States Patent and Trademark Office, Notice of Allowance and Fee(s) Due dated Apr. 11, 2024 for U.S. Appl. No. 18/198,765 , 5 pages.

* cited by examiner

US 12,095,658 B2

SYSTEMS AND METHODS FOR CLIENT-SERVER CONNECTION ABSTRACTION IN A SERVER COMPUTING ENVIRONMENT

CLAIM OF PRIORITY

This application claims the benefit of priority to U.S. Provisional patent application titled "SYSTEMS AND METHODS FOR USE WITH A MICROSERVICES OR OTHER COMPUTING ENVIRONMENT", Application No. 63/343,934, filed May 19, 2022, and U.S. Provisional patent application titled "SYSTEMS AND METHODS FOR USE WITH A MICROSERVICES OR OTHER COMPUTING ENVIRONMENT", Application No. 63/392,039, filed Jul. 25, 2022; each of which above applications and the contents thereof are herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

Embodiments described herein are generally related to cloud computing and other computing environments, software development, and microservice architectures, and are particularly directed to systems and methods for supporting application development, together with related libraries and features usable to build cloud-native applications or services.

BACKGROUND

Microservice environments present a software application as a collection of loosely-coupled services that are independently deployable and communicate with one another over a network, for example a cloud network as might be provided by a cloud computing environment. The microservice approach can be used, for example, to develop software applications or services to be provided in cloud computing environments as cloud-native applications or services.

SUMMARY

In accordance with an embodiment, described herein are systems and methods for use with a microservices or other computing environment, including a web server together with related libraries and features usable to build cloud-native applications or services.

In accordance with various embodiments, the systems and methods can include the use of various components or features that support, for example: (a) HTTP headers, (b) client and server connection abstraction, (c) router abstraction, and (d) identifying a protocol of a connection.

In accordance with an embodiment, the system provides, by means of a header enumeration, an abstraction that allows message headers to be treated as objects, accessible via an application program interface (API) that supports multiple communication protocols and allows clients and servers to communicate request/response messages using any of the supported protocols. When a request message with a known header type is encountered, the system can obtain an indexed value from the enumeration, if available, and provide the associated data (e.g., as data bytes) directly to the process to which the request is directed, and/or cache the header value for later use.

In accordance with an embodiment, to support testing of software applications or services, a client connection can be replaced, for testing purposes, with an in-memory implementation that does not invoke, e.g., HTTP, but instead exposes inverse-functions to a server connection; for example, data bytes written to a data writer of a client connection are available through a data reader on a server connection, and vice versa. During testing, the in-memory implementation uses a blocking queue in memory, which emulates the use of an HTTP protocol, but without using actual sockets. Once the testing (e.g., a unit test or an integration test), has been completed using the in-memory implementation, the client and/or server code can be tested against actual sockets, for use in processing a request.

In accordance with an embodiment, the system enables configuration of a server that can operate to serve requests via multiple network or communication protocols, such as for example HTTP1, gRPC over HTTP2, and/or WebSocket. A route abstraction allows each protocol to have its own routing, e.g., an HTTP routing. A sub-abstraction can provide a more specific route, for example as an HTTP/1.1 route, or an HTTP/2 route. For a request message received via a particular protocol, the system can pick up the appropriate route for the request, and process it accordingly.

In accordance with an embodiment, to support features such as client/server connection abstraction, router abstraction, or the use of different protocols on a single socket, an extensible service provider interface (SPI) provides software methods that allow protocol identification for a request message and connection. When a connection request message is received from a client directed to a server, a determination is made as to whether the request can be appropriately handled. The protocol identification process can, for example, return an indication that the system does not support the request protocol, that it does not have enough data to make a decision, or that additional data is needed to make such a determination.

DETAILED DESCRIPTION

Microservice environments present a software application as a collection of loosely-coupled services that are independently deployable and communicate with one another over a network, for example a cloud network as might be provided by a cloud computing environment (cloud environment). The microservice approach can be used, for example, to develop software applications or services to be provided in cloud computing environments as cloud-native applications or services.

Software development frameworks such as Helidon can be used in the development of microservices. For example, as described below, a Helidon environment provides a collection of software libraries that support features such as configuration, security, or web server functionality; and provide a software application developer with a foundation upon which to develop cloud-native applications or services.

In accordance with an embodiment, Helidon libraries can interoperate with other software development, deployment, and/or monitoring tools such as, for example, Docker, Kubernetes, Prometheus, or Jaeger.

Microservice Environments

FIGS. 1-4 illustrate various examples of microservice environments that provide a software development framework, in accordance with an embodiment.

In accordance with an embodiment, the components and processes illustrated in FIGS. 1-4, and as further described herein with regard to various embodiments, can be provided as computer software or program code executable by a computer system or other type of processing device, for example a cloud computing system.

Figure 1:
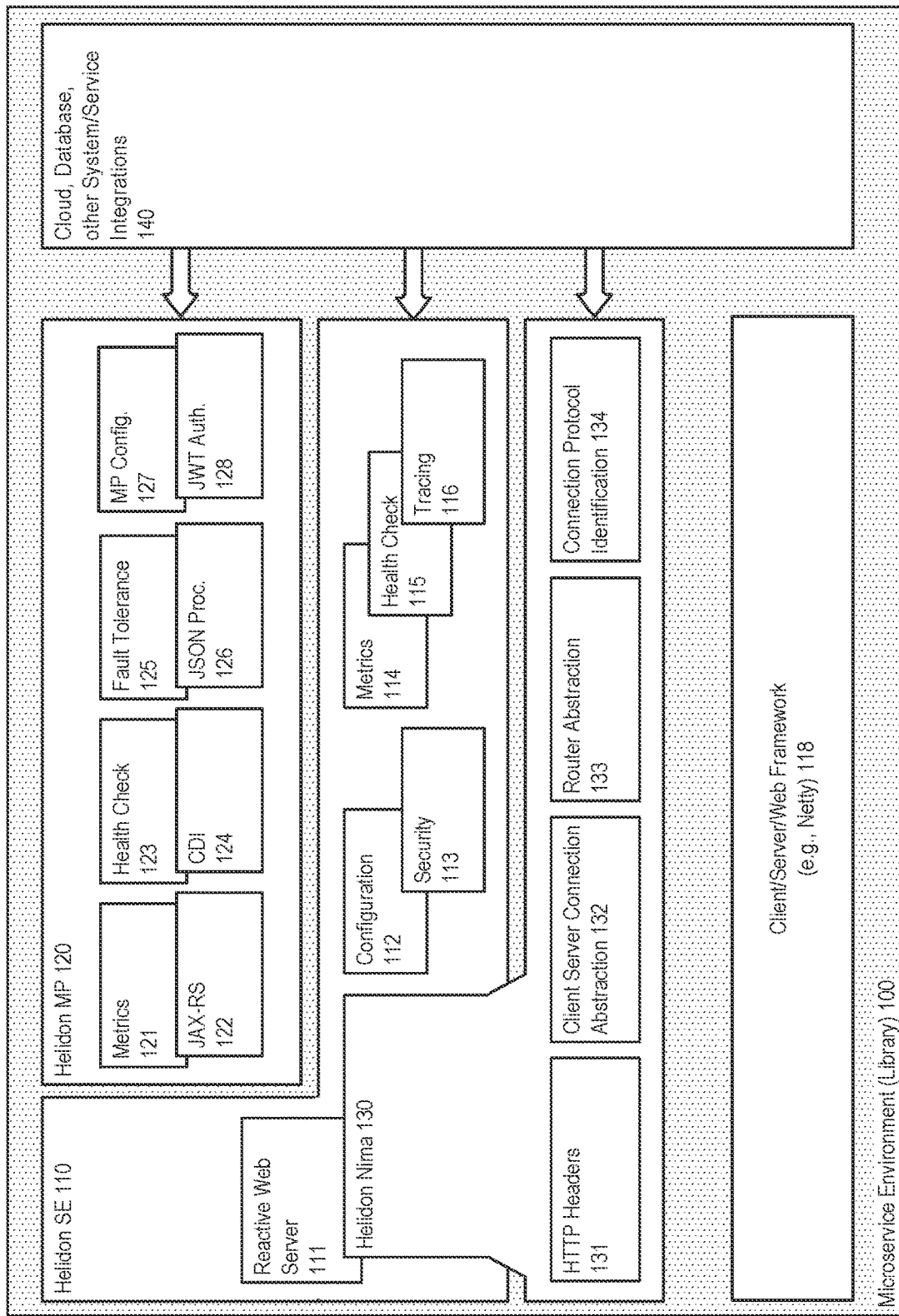
FIG. 1 illustrates various examples of microservice environments that provide a software development framework, in accordance with an embodiment.

As illustrated in FIG. 1, in accordance with an embodiment, a microservice environment (e.g., as provided by a microservices library) 100 can offer, for example, one or more Helidon SE 110, Helidon MP 120, and/or Helidon Nima 130 programming models or environments. The microservice environment can enable interactions by developed applications with cloud, database, or other systems or services 140.

The examples described herein of various embodiments of Helidon microservice environments are provided for purposes of illustrating examples of a microservice computing environment or microservice environment. In accordance with various embodiments, the systems and methods described herein can be used with other types of microservice environments or computing environments.

In accordance with various embodiments, the systems and methods can be used with other types of software development environments, or with other types of web server together with related libraries and features usable to build cloud native services.

Figure 2:
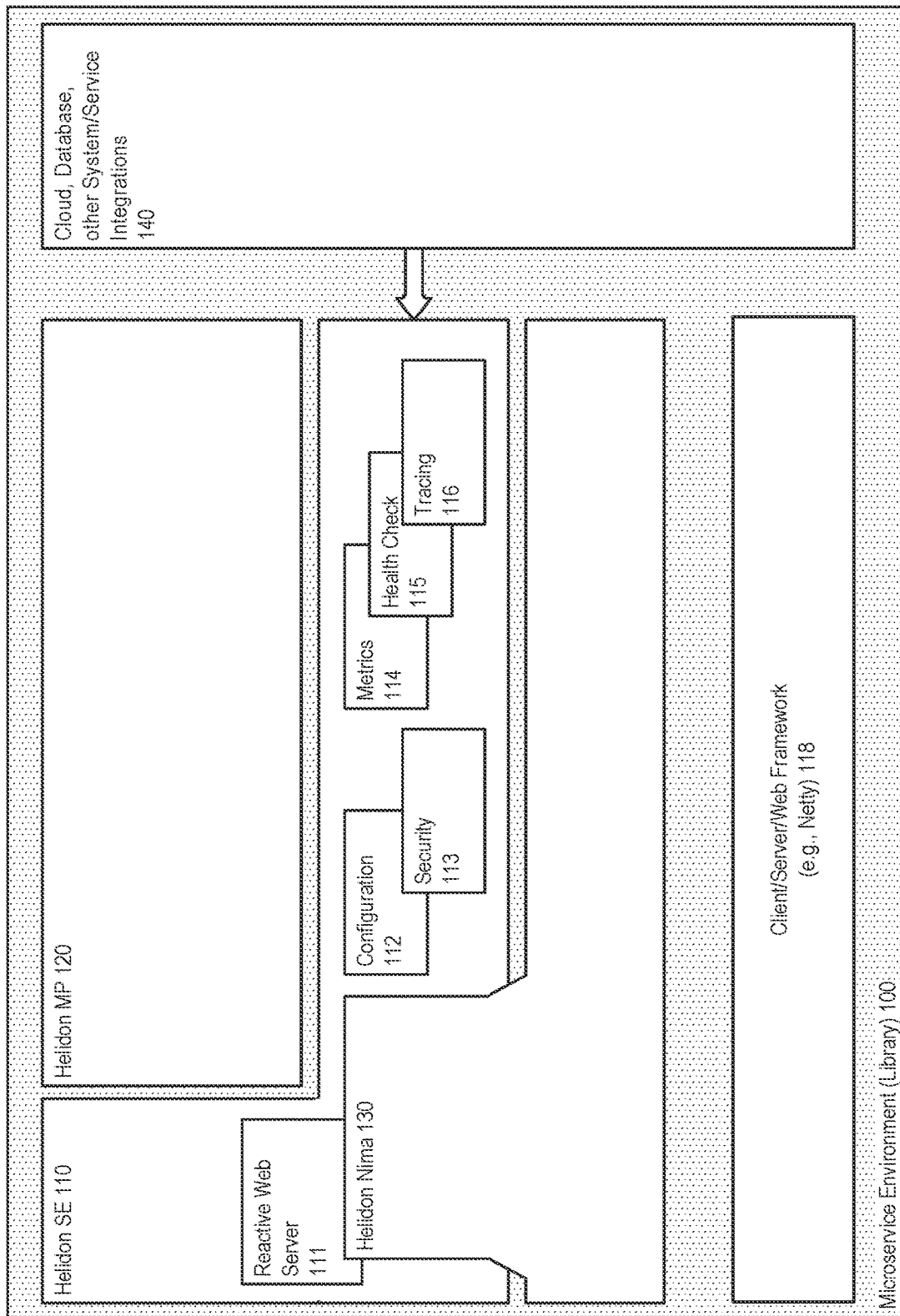
FIG. 2 further illustrates various examples of microservice environments that provide a software development framework, in accordance with an embodiment.

As illustrated in FIG. 2, in accordance with an embodiment, a Helidon SE environment supports a functional programming style that uses the web server, security and configuration components directly; provides the application developer with transparency and control; and supports Java features such as reactive streams, and asynchronous and functional programming.

For example, in accordance with an embodiment, a Helidon SE environment provides a framework by which the application developer can build lightweight reactive microservices. The environment can include various libraries, application program interfaces (APIs), or other components, such as, for example, a reactive web server 111, which provides an asynchronous and reactive API for creating web applications; a configuration API 112, which provides a Java API to load and process configuration properties in key/value form into a config object which an application can then use to retrieve config data; and a security component 113, which provides authentication, authorization, and outbound security; and can also include metrics 114, health check 115, and tracing 116 or other components.

Figure 3:
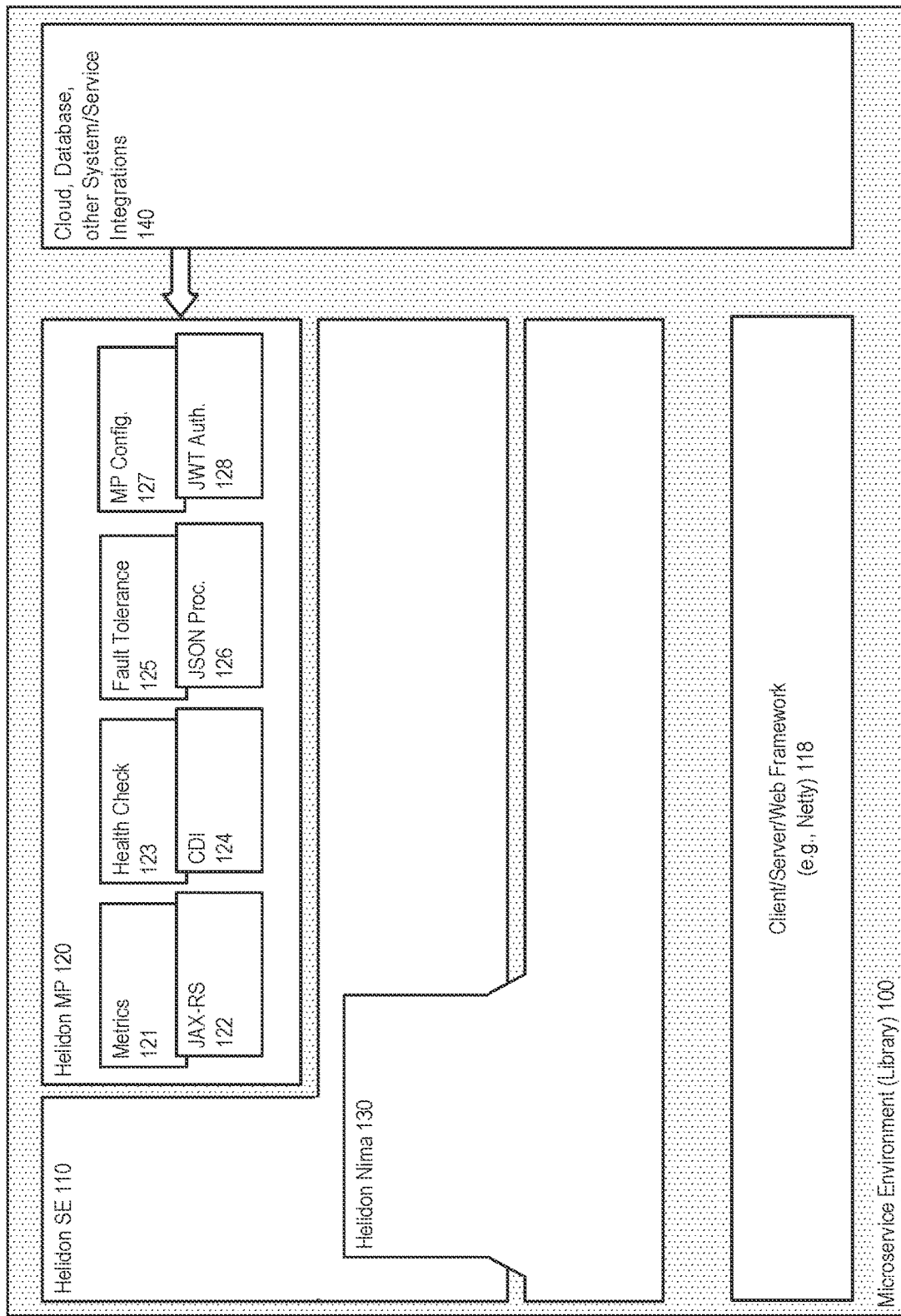
FIG. 3 further illustrates various examples of microservice environments that provide a software development framework, in accordance with an embodiment.

As illustrated in FIG. 3, in accordance with an embodiment, a Helidon MP environment supports a declarative programming style, through the use of a MicroProfile family of APIs built on top of the Helidon libraries. A MicroProfile definition (for example, as specified by the Eclipse MicroProfile project) can be used to support application portability across multiple MicroProfile runtimes.

For example, in accordance with an embodiment, a Helidon MP environment can include various libraries, APIs, or other components, such as, for example, JAX-RS 122, JSON-P 126, Contexts and Dependency Injection (CDI) 124, metrics 121, health check 123, fault tolerance 125, MicroProfile (MP) configuration 137, and JSON web token (JWT) authentication 128 components. The web server can be provided by a non-blocking client/server/web framework 118, such as, for example, Netty.

Figure 4:
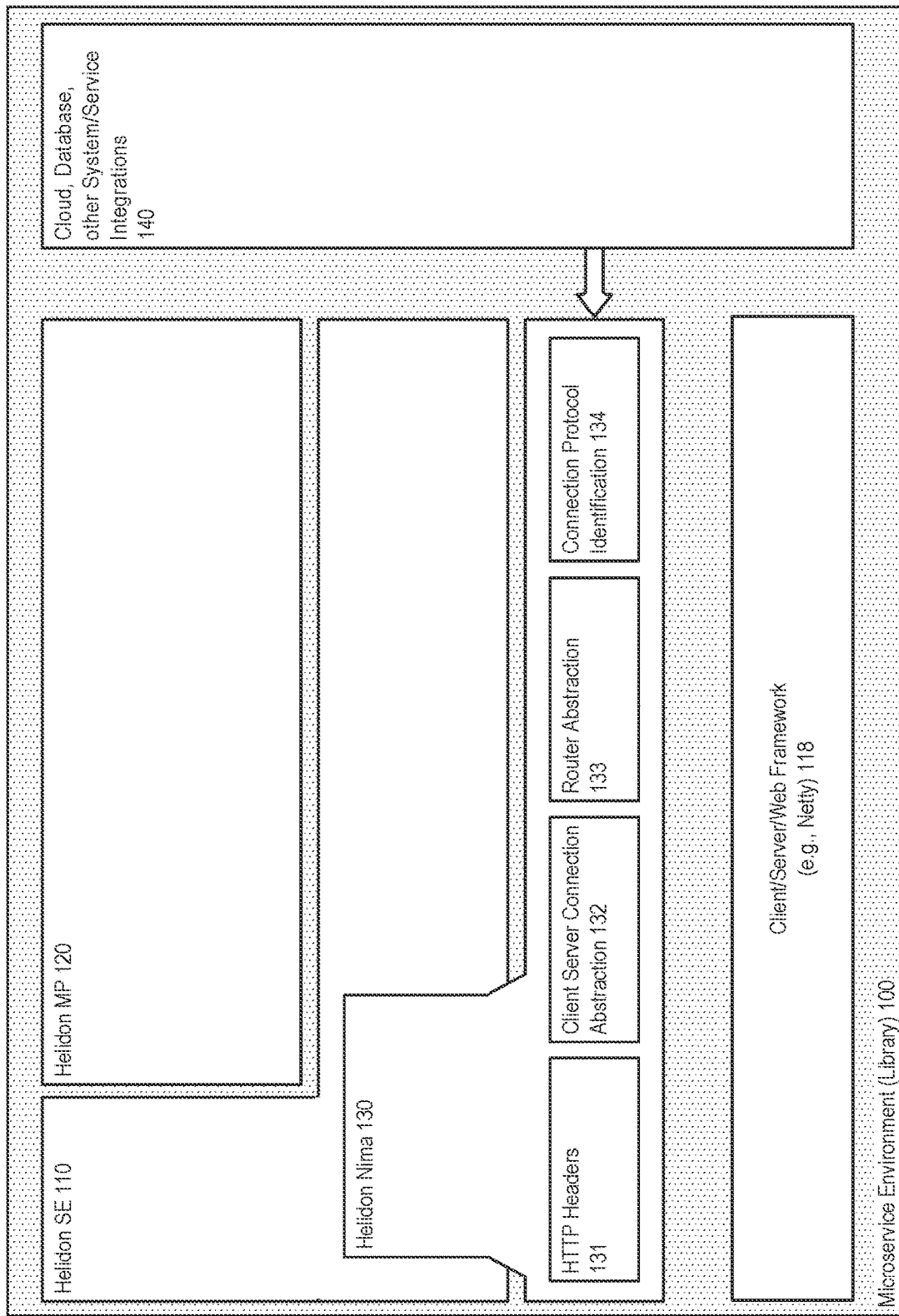
FIG. 4 further illustrates various examples of microservice environments that provide a software development framework, in accordance with an embodiment.

As illustrated in FIG. 4, in accordance with an embodiment, a Helidon Nima environment provides a Loom-based implementation of a web server together with related libraries and features usable to build a cloud-native service.

For example, in accordance with an embodiment, a Helidon Nima environment can include the use of various components or features that support, for example: HTTP headers 131, client and server connection abstraction 132, router abstraction 133, and connection protocol identification 134, by which an application developer can build, e.g., blocking (rather than reactive) microservices.

Figure 5:
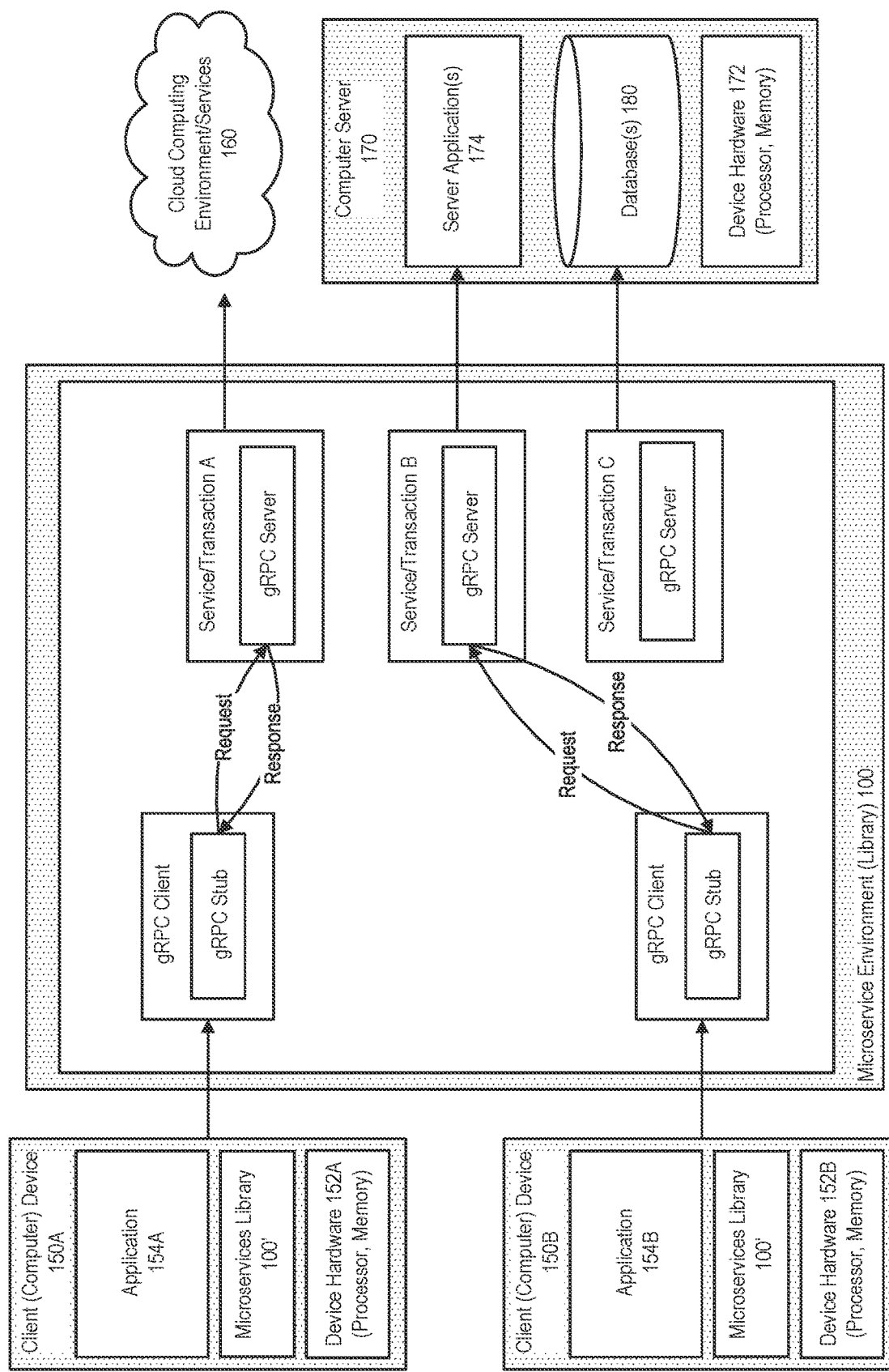
FIG. 5 illustrates a system comprising a microservice environment as used to develop applications for use in a cloud environment, in accordance with an embodiment.

FIG. 5 illustrates a system comprising a microservice environment as used to develop applications for use in a cloud environment, in accordance with an embodiment.

As illustrated in FIG. 5, in accordance with an embodiment, a microservice environment presents a software application as a collection of loosely-coupled services that are independently deployable and communicate with one another over a network, for example over a cloud network as might be provided by a cloud computing environment.

For example, in accordance with an embodiment a Helidon microservice environment can support the use of a remote procedure call (e.g., gRPC) framework or component, which enables (client and/or server) applications to communicate within the microservice environment, to build connected systems.

In accordance with an embodiment, a remote procedure call framework enables definition of a service and methods that can be called remotely. A server or service can handle calls from a client, via a local object (stub) that enables a client application to directly call a method on a server application as if it were a local object. The server/service implements methods to handle client calls, including decoding incoming requests, executing service methods, and encoding service responses. The local object (stub) implements the same methods as the service, wrapping the parameters for the call in an appropriate protocol buffer message type, which is then provided as requests to the server.

In accordance with an embodiment, a microservice environment (e.g., as provided by a microservices library) enables access by a client application 154 (e.g., 154A, 154B), at a client computer device 150 (e.g., 150A, 150B) having a device hardware 152 (e.g., 152A, 152B), to communicate with microservices or interact with cloud 160, server applications 174, database 180, or other systems or services, at computer server devices 170 have a device hardware 172, for purposes of accessing data, processing transactions, or performing other operations associated with those systems or services.

Figure 6:
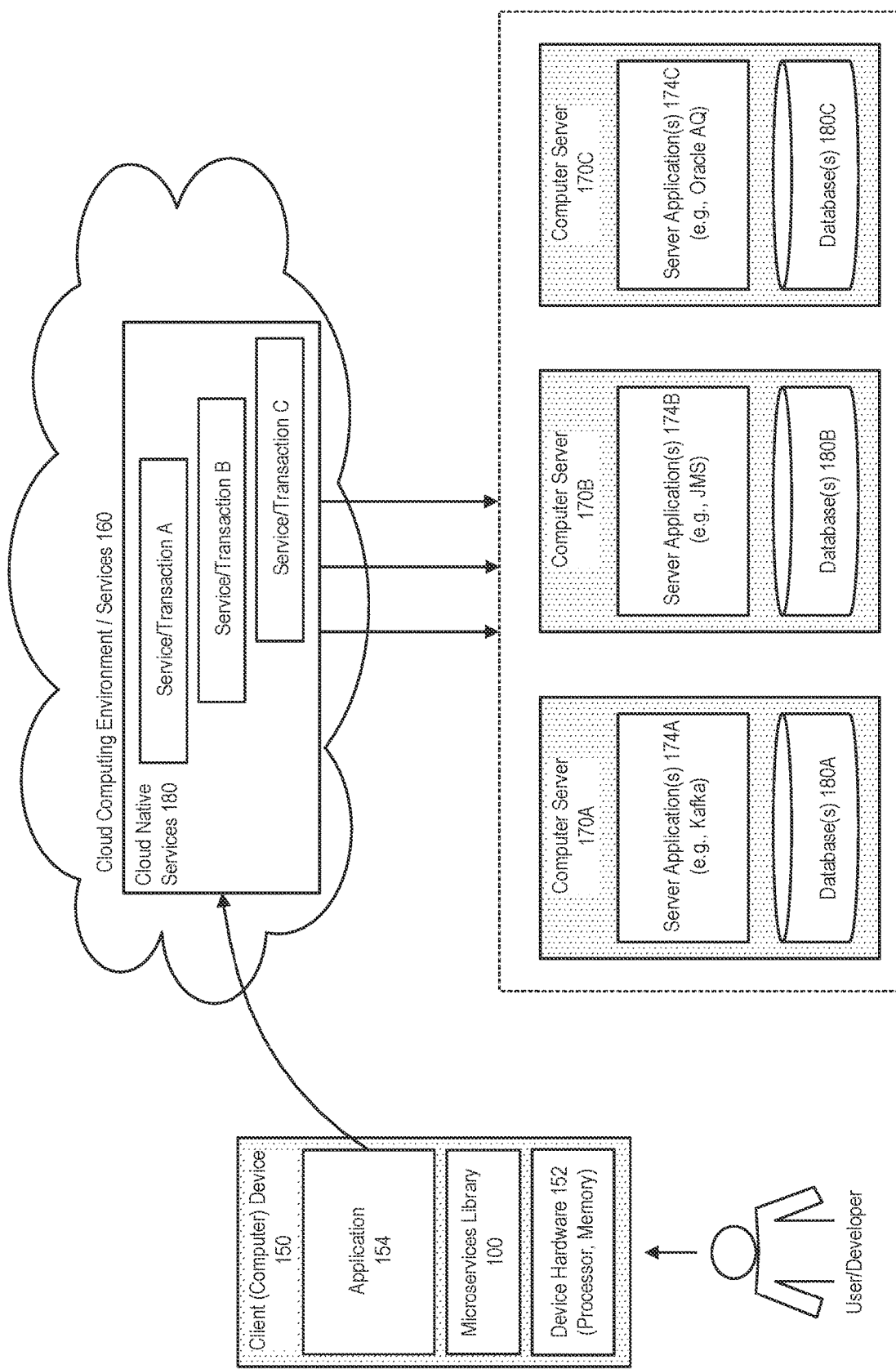
FIG. 6 further illustrates the use of a microservice environment to develop applications for use in a cloud environment, in accordance with an embodiment.

FIG. 6 further illustrates the use of a microservice environment to develop applications for use in a cloud environment, in accordance with an embodiment.

As illustrated in FIG. 6, in accordance with an embodiment, a microservice environment enables access by client applications to communicate with cloud native services 180 or otherwise interact with cloud, database, or other systems or services, for purposes of accessing data, processing transactions, or performing other operations associated with those systems or services.

HTTP Request Processing

In a cloud environment, web services that enable client applications to interact with servers may be HTTP-based, i.e., the client applications and servers can use a HTTP communication protocol as a means of communicating requests and responses between various participants in the form of data messages.

For example, in a cloud service that provides access to one or more databases or other services, the processing of a client request may be intended to result in several initial calls, each of which can then call upon another service to perform some additional aspect of processing the request.

In some cloud environments, reactive programming techniques can be used to support concurrent processing of requests. However, since reactive programming is non-blocking, it can be difficult to troubleshoot the operation of a reactive application. For example, a thread-dump that might otherwise be useful in assessing the status of various threads provides little or no information for testing or debugging purposes when used in a reactive environment.

In accordance with an embodiment, to address such considerations, the system can include a request processing component, for example a Loom-based implementation of a web server (WebServer), together with related libraries and features usable to build a cloud native service (referred to herein in some embodiments as Helidon Nima).

In accordance with an embodiment, such a request processing component supports concurrency of client-server communications with the use of virtual threads. Such virtual threads allow client HTTP applications to operate, e.g., request connections to server processes, in a normal blocking manner, while the underlying request processing (e.g., Loom-based) environment handles concurrency of request processing.

This offers an improved code development process, in that the application developer does not have to build-in reactive programming within the application itself. Additionally, during testing or debugging, a thread dump provides more useful information for troubleshooting purposes. As such, the approach offers the features of a traditional programming environment coupled with the concurrency benefits of reactive programming.

For example, in accordance with an embodiment, a Helidon Nima environment allows an application developer to set up HTTP endpoints by which a server can serve web clients. A client application can run within the environment in a blocking manner, while taking of the virtual threading which provides a virtual thread for each connection, such that high levels of concurrency are achieved.

Figure 7:
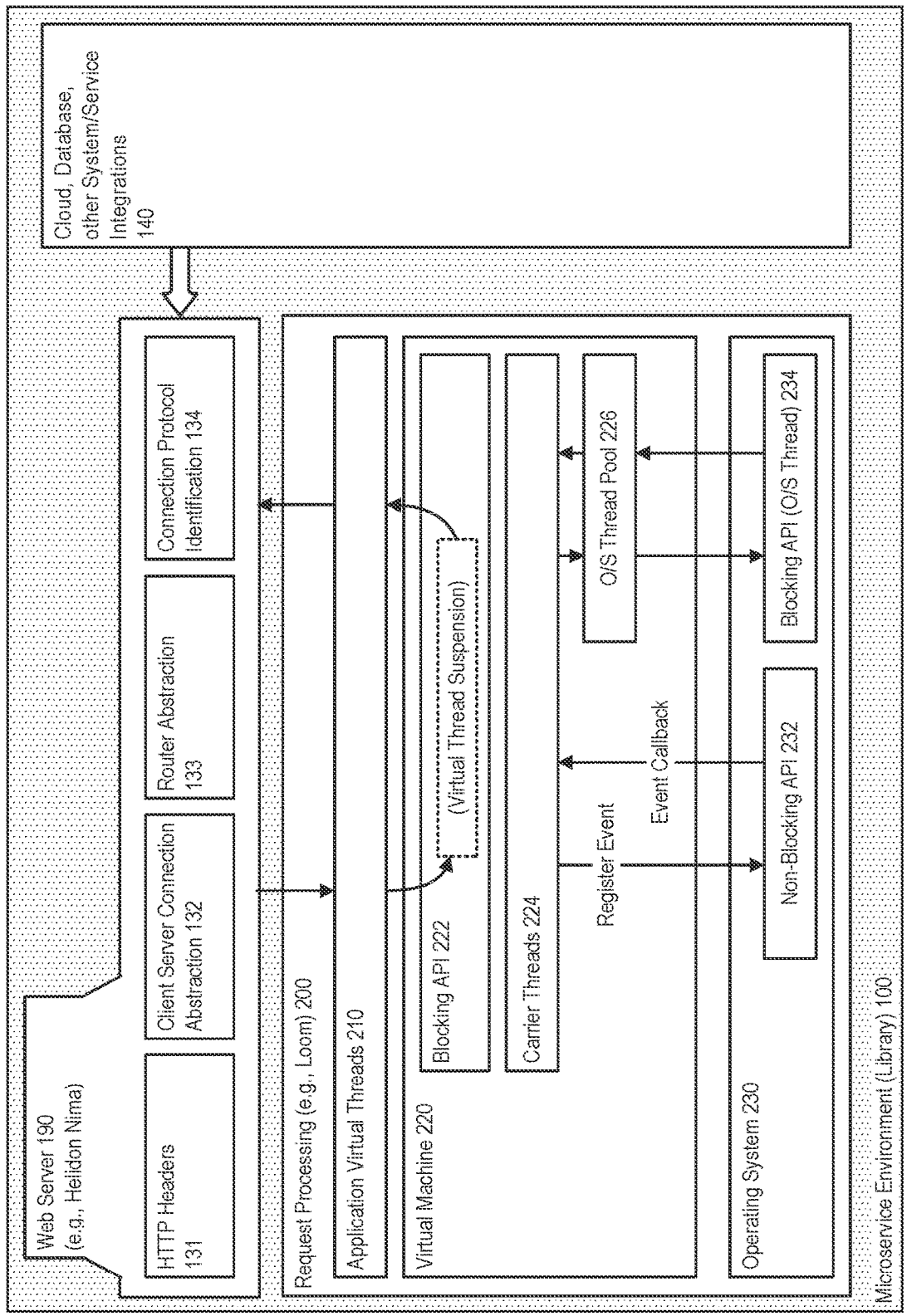
FIG. 7 illustrates a system comprising a microservice environment, in accordance with an embodiment.

FIG. 7 illustrates a system comprising a microservice environment, in accordance with an embodiment.

As illustrated in FIG. 7, in accordance with an embodiment, when used with a web server 190 (WebServer, e.g., a Helidon Nima environment) a request processing component 200, for example a Loom-based implementation of a web server, allows blocking code to be used without the requirement for high number of platform threads to be used, including the use of blocking APIs that allow requests directed to the server to run on application virtual threads 210.

In accordance with an embodiment, virtual threads (referred to in some examples as fibers) operate as lightweight threads that enable the execution of high-throughput concurrent applications. Generally described, a virtual thread provides an instance of an execution thread (e.g., a java-.lang.Thread) which is not tied to a particular operating system (O/S) thread. An application code can run in a virtual thread for the duration of a request; the virtual thread in turn consumes an O/S thread while it performs operations on the processor.

In accordance with an embodiment, non-blocking APIs can be encapsulated by synchronous APIs, and made virtual-thread-ready, by blocking the further execution of virtual thread until the corresponding operation is completed. In this manner each virtual thread can be suspended for a period, and then continued at a subsequent time.

For example, as illustrated in FIG. 7, in accordance with an embodiment, when executed in a virtual machine 220, a request can be received at a blocking API 222. A plurality of carrier threads 224 communicate with an underlying operating system 230, for example via registering events and callbacks at a non-blocking API 232, or via an O/S thread pool 226 and blocking API 234.

In accordance with an embodiment, such a request processing component allows the application developer to take advantage of non-blocking APIs during software development, without changing their thread-per-request programming model. The described approach also allows the system to use blocking code, such as outbound HTTP requests, or database requests, without the need to handle complicated executor services.

Figure 8:
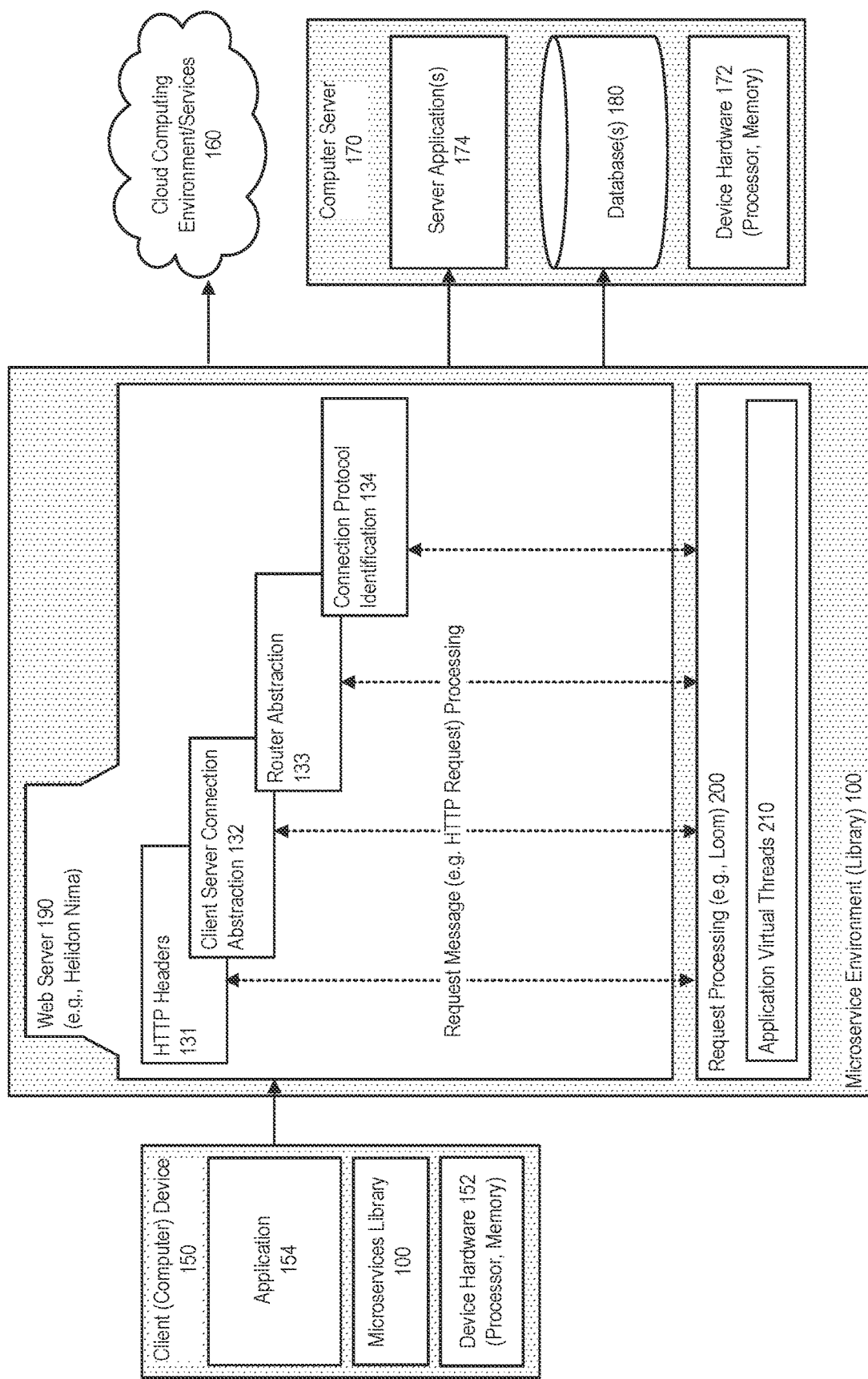
FIG. 8 illustrates a web server for use with a microservice environment, in accordance with an embodiment.

FIG. 8 illustrates a web server for use with a microservice environment, in accordance with an embodiment.

As illustrated in FIG. 8, in accordance with an embodiment, a web server that uses virtual threads, such as, for example, a Loom-based implementation of a web server, can be provided as an alternative or replacement to the functionality otherwise provided by a reactive web server (e.g., reactive web server 111) and/or non-blocking client/server/web framework (e.g., framework 118).

As described above, a request processing component supports concurrency of client-server communications with the use of virtual threads. Such virtual threads allow client HTTP applications to operate, e.g., request connections to server processes, in a normal blocking manner, while the underlying request processing (e.g., Loom-based) environment handles concurrency of request processing.

For example, in accordance with an embodiment of a Helidon SE environment, the request processing component can be provided as a replacement of the reactive web server typically provided therein, wherein instead of using reactive programming, the application developer can use the virtual threads provided by the web server to support application processing that is blocking, rather than reactive, while providing similar performance aspects.

In accordance with various embodiments, the request processing component can be provided herein can similarly be provided as a web server for use with other/new versions of Helidon (e.g., Helidon Nima).

For example, in accordance with an embodiment, from the perspective of an application developer, they can include in their application either a blocking code, which directly uses the virtual threading features of request processing component, e.g., a Loom-based web server; or an application code that is itself reactive, but which the (e.g., Loom-based) web server can then process, transparently to the application developer, using the virtual threading features provided by the web server.

Web Server/Web Client

In accordance with various embodiments, the systems and methods can include the use of various components or features that support, for example: (a) HTTP headers, (b) client and server connection abstraction, (c) router abstraction, and (d) identifying a protocol of a connection.

In accordance with an embodiment, a web server (WebServer) can be provided as an extensible module, with a default implementation that supports the HTTP/1.1 protocol.

A web server SPI provides extensibility to support, for example: upgrading from a HTTP/1 protocol, such as an upgrade to HTTP/2 using plain sockets, or an upgrade to WebSocket; other protocols, including non-HTTP protocols, extensible through discovery based on binary data, such as HTTP/2 with prior knowledge; and/or application layer protocol negotiation (ALPN) support for Transport Layer Security (TLS) requests, such as HTTP/1.1, HTTP/2.

In accordance with an embodiment, extension modules can include, for example: an HTTP/2 protocol implementation; an HTTP/2 over TCP (h2c, plain socket) upgrade from HTTP/1, with prior knowledge; an h2c (TLS) (ALPN support); a gRPC protocol implementation, as a "sub-protocol" of HTTP/2; and/or a WebSocket protocol implementation upgrade from HTTP/1.

In accordance with an embodiment, the web server supports HTTP (version-agnostic) routing, with support for version specific routes; and an extensible Router API that supports non-HTTP protocol routings. Some extension modules provide their own routing, for example: HTTP/2, which also supports a default HTTP routing (version-agnostic); gRPC, including protocol-specific routes supporting all message types (unary, client stream, server stream, and bidirectional); and/or WebSocket, protocol-specific route, supporting a listener with a session.

In accordance with an embodiment, a web client (WebClient) can be provided as an extensible module, with a default implementation that supports the HTTP/1.1 protocol. A web client SPI supports other protocols to be used sharing a basic configuration. In accordance with an embodiment, the following extensions can be included: HTTP/1.1 client; HTTP/2 client.

In accordance with an embodiment, the WebServer and WebClient modules are designed to be testable, for example with JUnit5. The system can support either HTTP communication, or in-memory communication, depending on the annotation chosen, for example, an @ServerTest provides HTTP communication over socket, to create integration tests; and/or an @RoutingTest provides in-memory communication, to create unit tests.

In accordance with an embodiment, additional modules can be included, for example: a fault tolerance, blocking fault tolerance implementation for "circuit breaker", "bulkhead", "fallback", and "retry" scenarios; an observability endpoint to obtain information about the application, such as health, metrics, configuration, application info, etc.; a means of providing extensibility to plug other modules into the "observe" mechanism; and/or tracing, or open telemetry tracing support.

A. HTTP Headers

Within a cloud environment that supports client-server communications via different communication protocols, each communication protocol may have its own requirements as to the formatting of messages passed between the participants, including message headers.

For example, the HTTP/1 and HTTP/2 protocols have different requirements as to the format of message headers used when sending request or response messages via those protocols.

Parsing such headers requires a considerable amount of computational overhead, particularly when thousands of requests need to be processed at the same time, as might be encountered in a cloud environment. Preparing responses to such requests with their appropriate headers similarly requires a considerable amount of computational overhead.

In accordance with an embodiment, the system provides, by means of a header enumeration, an abstraction that allows message headers to be treated as objects, accessible via an application program interface (API) that supports multiple communication protocols and allows clients and servers to communicate request/response messages using any of the supported protocols.

When a request message with a known header type is encountered, the system can obtain an indexed value from the enumeration, if available, and provide the associated data (e.g., as data bytes) directly to the process to which the request is directed, and/or cache the header value for later use.

For example, HTTP header parsing, handling and serialization is one of the more computationally-expensive part of processing HTTP requests. To improve performance on all of these tasks, the system can provide a new abstraction of headers, both for the name of the header (interface HeaderName) and for the whole header value (interface HeaderValue).

Additionally, with HTTP/2 being used increasingly more often, it is advantageous to use headers that work well in both HTTP versions. Although implementations in Java may use a String or a CharSequence to identify a header, or optimize the byte values of the header name, they do not use an indexed approach for commonly used headers.

The described approach avoids the need to look-up a header map for each request, and provides computational savings particularly when processing a large amounts of requests as may be encountered in a cloud environment.

Figure 9:
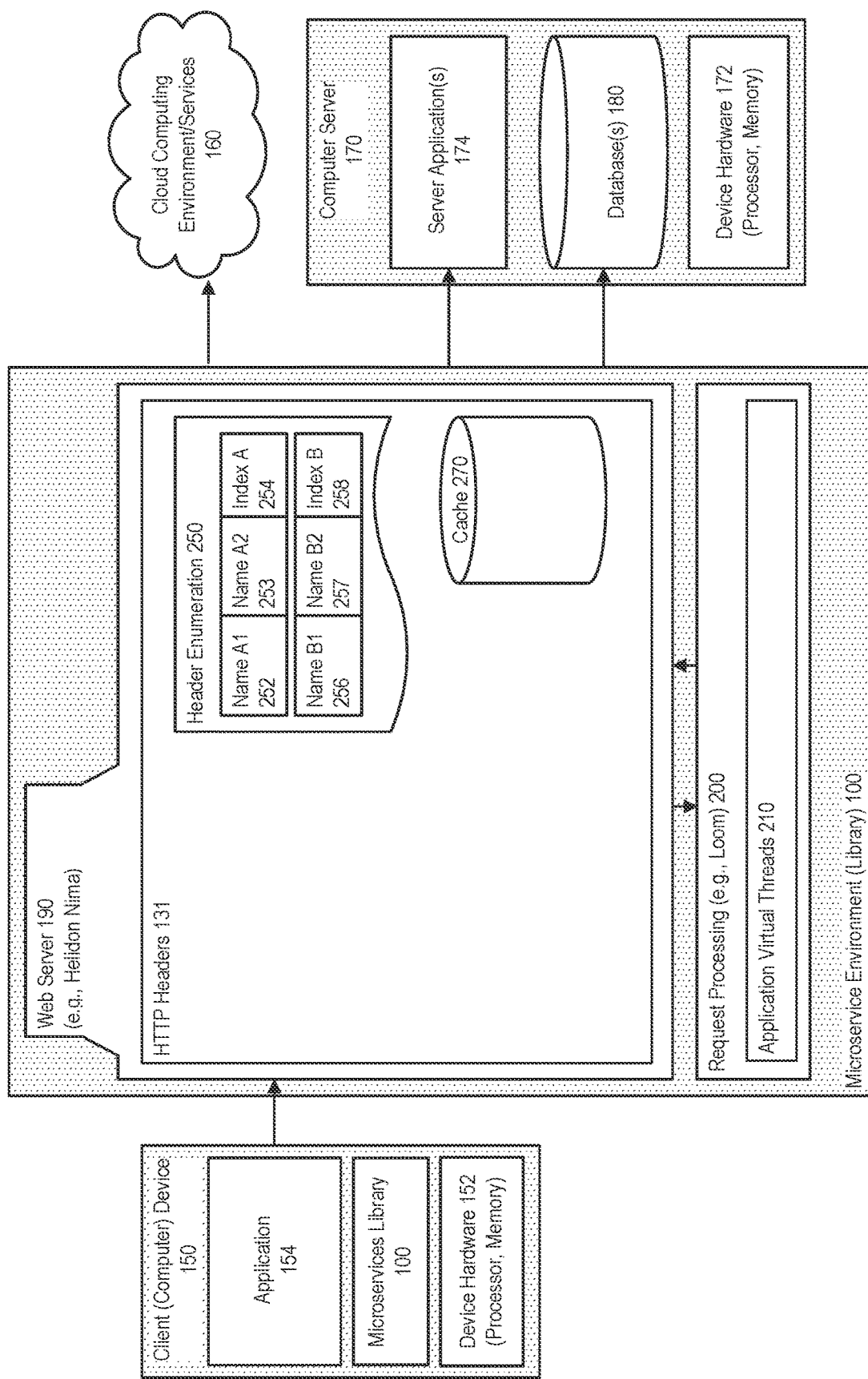
FIG. 9 illustrates support for HTTP header processing, in accordance with an embodiment.

FIG. 9 illustrates support for HTTP header processing, in accordance with an embodiment.

As illustrated in FIG. 9, in accordance with an embodiment, the system provides, by means of a header enumeration 250, an abstraction that allows message headers to be treated as objects, accessible via an application program interface (API) that supports multiple communication protocols and allows clients and servers to communicate request/response messages using any of the supported protocols.

In accordance with an embodiment, when a request message with a known header type (e.g., A1 252, A2 253, B1 256, B2 257) is encountered, the system can obtain an indexed value (e.g., A 254, B 258) from the enumeration, if available, and provide the associated data (e.g., as data bytes) directly to the process to which the request is directed, and/or cache 270 the header value for later use.

In accordance with an embodiment, the HTTP header is used as an object type. When a known header is created, the system can cache all of the following: the data bytes of the value (if single valued); the full HTTP/1 bytes of the whole header (e.g. "Content-Encoding: gzip"); whether the value is sensitive, and should not be logged, and never indexed (HTTP/2); and whether the value is changing, and should not be cached, and indexed (HTTP/2).

In accordance with an embodiment, for headers parsed from requests, the system can use lazy evaluation, including storing the bytes, until a server or other process actually requests the header value; as there are usually headers that are never requested, this uses less processor (CPU) resources to process each request.

In accordance with an embodiment, the known header names (i.e., those header names that are commonly-used) are implemented in an enumeration (HeaderEnum). The enumeration keeps: a lower cased name (String)—used by HTTP/2, to prevent frequent lowercasing of Strings; and a "default case" name (String)—used by HTTP/1, to have expected header names; an index of the header, to support optimized storage in requests and responses—to quickly identify if a header is present or not, and to optimize retrieval of such headers through indexed access to an array. This is a significant improvement, since various implementations may otherwise use a map to store headers, and Map store and retrieval operations are considerably more expensive than direct indexed array access.

Figure 10:
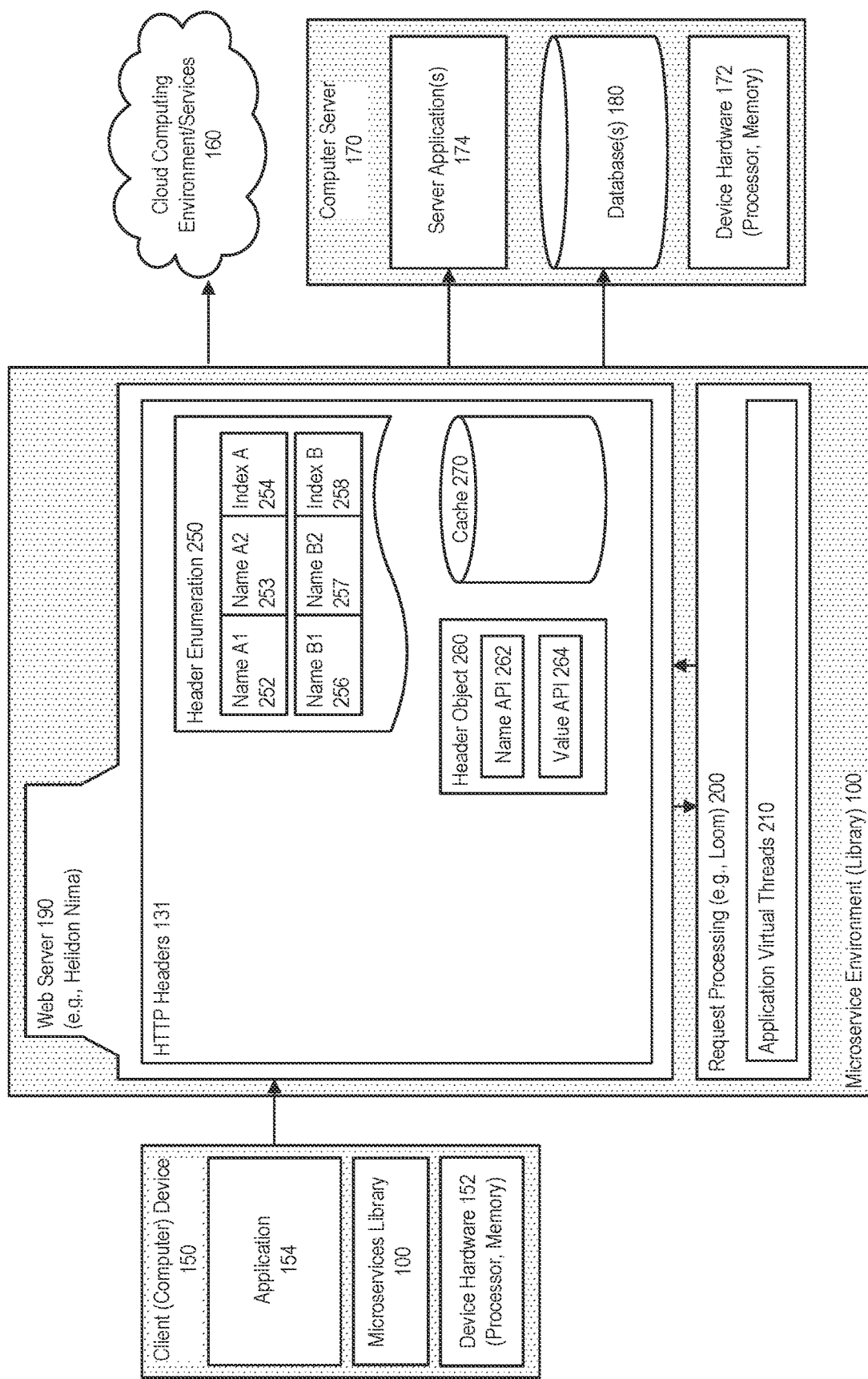
FIG. 10 further illustrates support for HTTP header processing, in accordance with an embodiment.

FIG. 10 further illustrates support for HTTP header processing, in accordance with an embodiment.

As illustrated in FIG. 10, in accordance with an embodiment, a header object 260 can be accessed via a high-Level API that can be provided as a name API 262 (e.g., a HeaderName interface) and value API 264 (e.g., a HeaderValue interface).

In accordance with an embodiment, a HeaderName interface can include methods such as:
  A method String lowerCase( )—a HTTP/2 name of the header (such as content-type).
  A method String defaultCase( )—a HTTP/1 name of the header (such as Content-Type).
  A method int index( )—to identify "known" headers (0+) and custom headers (−1).
  A method boolean isPseudoHeader( )—HTTP/2 pseudo headers, such as "Host" in HTTP/1 is ": authority" pseudo header in HTTP/2.

In accordance with an embodiment, a HeaderValue interface can include methods such as:
  A method HeaderName headerName( )—a name of the header.
  A method String value( )—a first value of the header, may be backed by lazy evaluation.
  Other methods for multi-valued headers.

Figure 11:
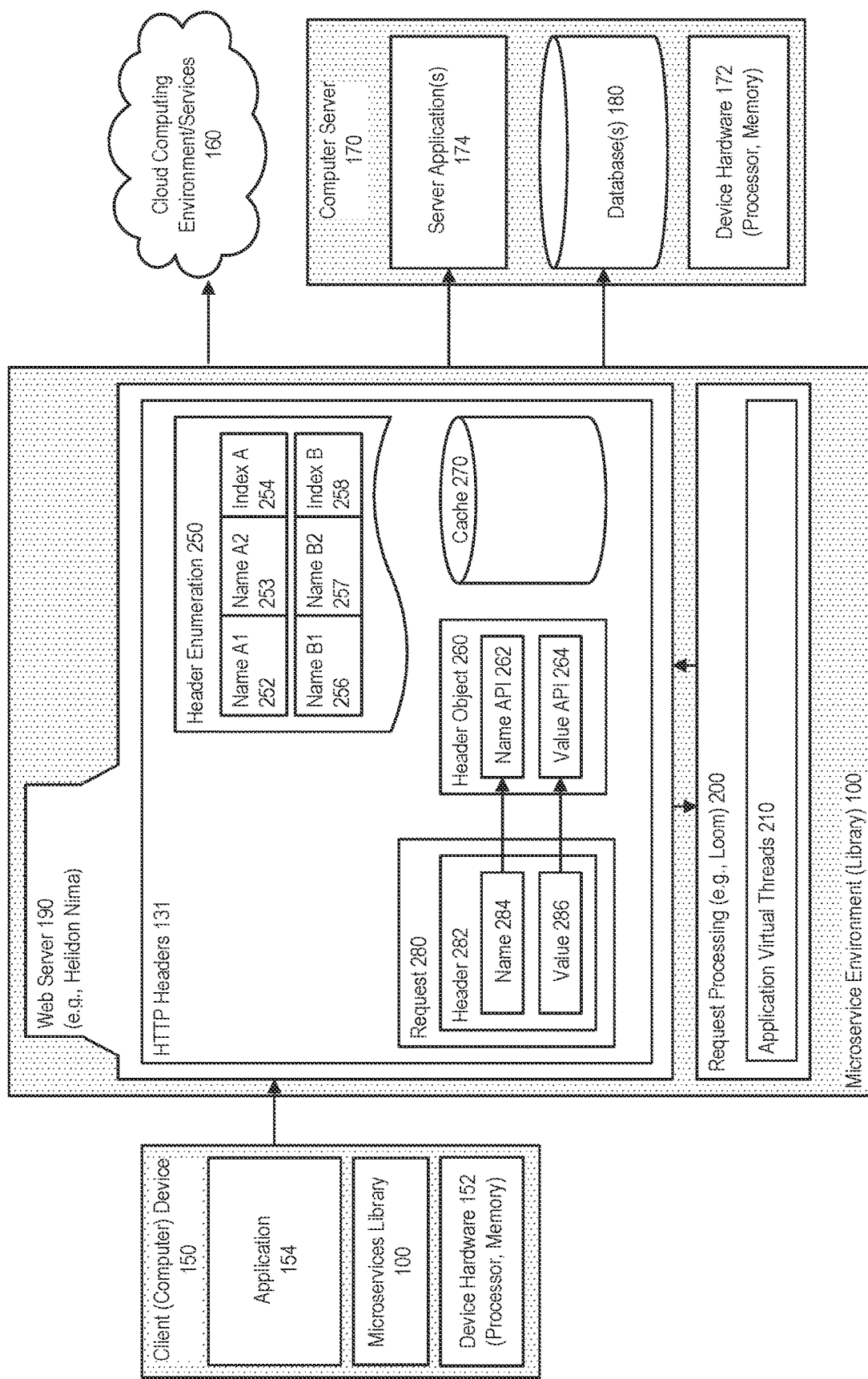
FIG. 11 further illustrates support for HTTP header processing, in accordance with an embodiment.

FIG. 11 further illustrates support for HTTP header processing, in accordance with an embodiment.

As illustrated in FIG. 11, in accordance with an embodiment, HTTP Header is used as an object type. When a request 280 having a known header 282 or as indicated by its header name 284, is created, the system can cache, for the value 286, all of the following: the data bytes of the value (if single valued); the full HTTP/1 bytes of the whole header (e.g. "Content-Encoding: gzip"); whether the value is sensitive, and should not be logged, and never indexed (HTTP/2); and whether the value is changing, and should not be cached, and indexed (HTTP/2).

Figure 12:
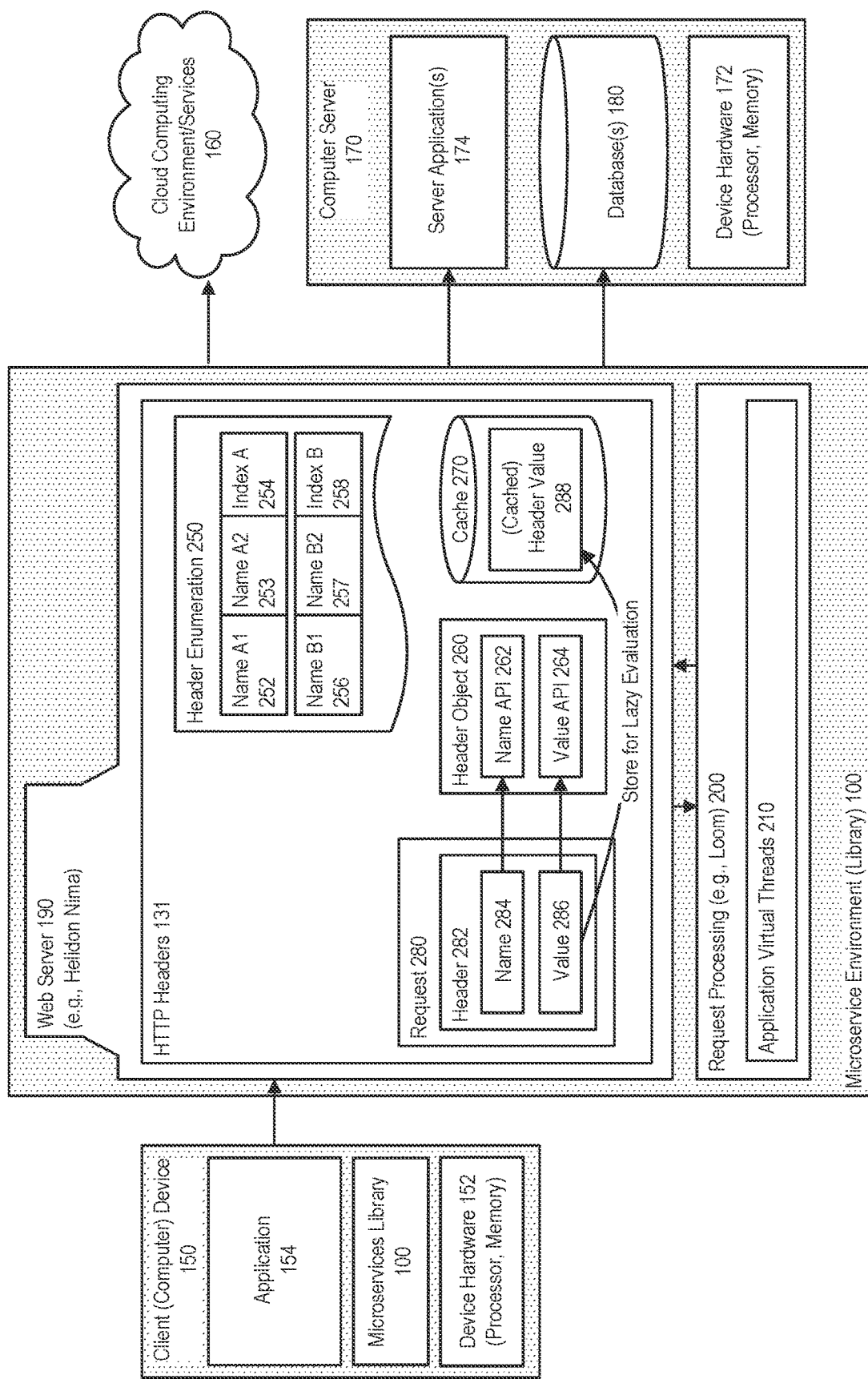
FIG. 12 further illustrates support for HTTP header processing, in accordance with an embodiment.

FIG. 12 further illustrates support for HTTP header processing, in accordance with an embodiment.

As illustrated in FIG. 12, in accordance with an embodiment, for headers parsed from requests, the system can use lazy evaluation and store the bytes as a cached header value 288, until a server or other process actually requests the header value.

In accordance with an embodiment, the system can provide support for various interfaces, classes, or methods, such as for example as by the below program, which provides an implementation of a string that is created from bytes only when needed (and cached value), for example:

```
inner class Header
    constants on class
    methods
        create (String)
        create (String, String)
        createFromLowercase (String)
inner class HeaderName
inner class HeaderValue
methods
    createCached (HeaderName, String)
    create (HeaderName, LazyString)
```

```
    create (HeaderName, String...)
    createCached (HeaderName, boolean, boolean, String)
    create (HeaderName, boolean, boolean, String...)
    inner class HeaderValues
        constants on class
```

The above examples are provided for purposes of illustration; in accordance with various embodiments other examples of interfaces, classes, or methods, can be provided.

Figure 13:
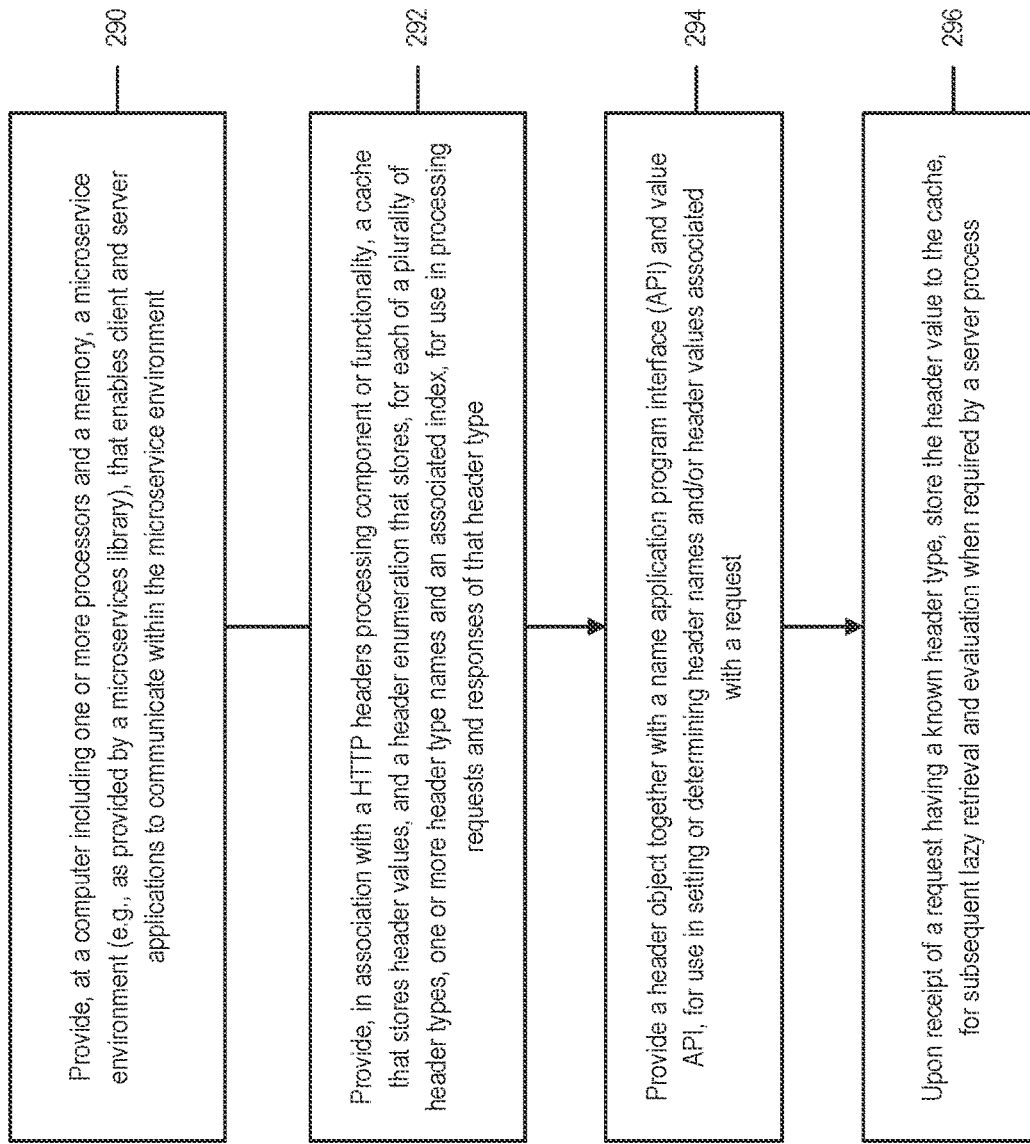
FIG. 13 illustrates a method for use with a microservice environment, for processing HTTP headers, in accordance with an embodiment.

FIG. 13 illustrates a method for use with a microservice environment, for processing HTTP headers, in accordance with an embodiment.

As illustrated in FIG. 13, in accordance with an embodiment, at step 290, at a computer including one or more processors and a memory, a microservice environment (e.g., as provided by a microservices library) is provided, that enables client and server applications to communicate within the microservice environment.

At step 292, the system provides, in association with a HTTP headers processing component or functionality, a cache that stores header values, and a header enumeration that stores, for each of a plurality of header types, one or more header type names and an associated index, for use in processing HTTP requests and responses of that header type.

At step 294, a header object is provided, together with a name application program interface (API) and value API, for use in setting or determining header names and/or header values associated with a HTTP request.

At step 296, upon receipt of a request having a known header type, the system stores the header value to the cache, for subsequent lazy retrieval and evaluation when required by a server process.

Example Interface

In accordance with an embodiment, provided below for purposes of illustration is an example interface for providing HTTP headers. In accordance with other embodiments, other types of interface can be provided.

Interface HeaderName

In accordance with an embodiment, an Http.HeaderName interface can be used to provide a HTTP header name, and can include various methods, for example:

A method String lowerCase( ) a lowercase value of this header, used by HTTP/2, may be used for lookup by HTTP/1. There is no validation of this value, so if this contains an upper-case letter, behavior is undefined. In an embodiment, the method returns: a name of the header, lowercase.

A method String defaultCase( ): a header name as used in HTTP/1, or "human-readable" value of this header. In an embodiment, the method returns: a name of the header, may use uppercase and/or lowercase.

A method int index( ) an index of this header (if one of the known indexed headers), or −1 if this is a custom header name. In an embodiment, the method returns: an index of this header.

A method boolean isPseudoHeader( ): HTTP/2 defines pseudoheaders as headers starting with a: character. These are used instead of the prologue line from HTTP/1 (to define path, authority etc.) and instead of status line in response. In an embodiment, the method returns: whether this header is a pseudo-header.

Interface HeaderValue

In accordance with an embodiment, an Http.HeaderValue interface can be used to provide a HTTP Header value, and can include various methods, for example:

A method static Http.HeaderValue createCached (Http.HeaderName name, String value). Create and cache byte value. This method is used if the header value is stored in a constant, or used repeatedly. Parameters that can be provided include, for example: name—header name; value—value of the header. In an embodiment, the method returns: a new header.

A method static Http.HeaderValue create (Http.HeaderName name, LazyString value). Create a new header with a single value. This header is considered unchanging and not sensitive. Parameters that can be provided include, for example: name—name of the header; value—lazy string with the value. In an embodiment, the method returns: a new header.

A method static Http.HeaderValue create (Http.HeaderName name, String value). Create a new header with a single value. This header is considered unchanging and not sensitive. Parameters that can be provided include, for example: name—name of the header; value—value of the header. In an embodiment, the method returns: a new header.

A method static Http.HeaderValue create (Http.HeaderName name, String . . . values). Create a new header. This header is considered unchanging and not sensitive. Parameters that can be provided include, for example: name—name of the header; values—values of the header. In an embodiment, the method returns: a new header.

A method static Http.HeaderValue create (Http.HeaderName name, List<String>values). Create a new header. This header is considered unchanging and not sensitive. Parameters that can be provided include, for example: name—name of the header; values—values of the header. In an embodiment, the method returns: a new header.

A method static Http.HeaderValue createCached (Http.HeaderName name, boolean changing, boolean sensitive, String value). Create and cache byte value. This method is used if the header value is stored in a constant, or used repeatedly. Parameters that can be provided include, for example: name—header name; changing—whether the value is changing often (to disable caching for HTTP/2); sensitive—whether the value is sensitive (to disable caching for HTTP/2); value—value of the header. In an embodiment, the method returns: a new header.

A method static Http.HeaderValue create (Http.HeaderName name, boolean changing, boolean sensitive, String . . . values). Create a new header. Parameters that can be provided include, for example: name—name of the header; changing—whether the value is changing often (to disable caching for HTTP/2); sensitive—whether the value is sensitive (to disable caching for HTTP/2); values—value(s) of the header. In an embodiment, the method returns: a new header.

A method String name( ) Name of the header as configured by user or as received on the wire. In an embodiment, the method returns: a header name, always lower case for HTTP/2 headers.

A method Http.HeaderName headerName( ). Header name for the header. In an embodiment, the method returns: a header name.

A method String value( ) First value of this header. In an embodiment, the method returns: the first value.

A method List<String>allValues( ). All values of this header. In an embodiment, the method returns: all configured values.

A method default List<String>allValues (boolean split). All values of this header. If this header is defined as a single header with comma separated values, set split to true. Parameters that can be provided include, for example: split—whether to split single value by comma, does nothing if the value is already a list. In an embodiment, the method returns: a list of values.

A method boolean sensitive( ) Sensitive headers should not be logged, or indexed (HTTP/2). In an embodiment, the method returns: whether this header is sensitive.

A method boolean changing( ) Changing headers should not be cached, and their value should not be indexed (HTTP/2). In an embodiment, the method returns: whether this header's value is changing often.

A method default byte ☐ valueBytes( ). Cached bytes of a single valued header's value. In an embodiment, the method returns: value bytes.

A method default void writeHttp1 Header (BufferData buffer). Write the current header as an HTTP header to the provided buffer. Parameters that can be provided include, for example: buffer—buffer to write to (should be growing).

Headers Implementation

In accordance with an embodiment, a Headers object can be used to store headers parsed from a request, or configured by a user for later retrieval (either by user for processing, or by the server to be written over the network). The following example illustrates the parts that are required to utilize direct access when getting and setting a header:

```
class Headers
// array of known headers, accessed via index
HeaderValue[ ] knownHeaders = new HeaderValue[ KNOWN_HEADER_SIZE]
Map<HeaderName, HeaderValue> customHeaders = new Map ( )
HeaderValue find (HeaderName name)
   var index = name.index( )
   return index == -1 ? customHeaders.get(name) : knownHeaders[index]
void set (HeaderValue value)
   var name = header.headerName( )
   var index = name.index( )
   if (index == -1) {
      customHeaders.put(name, value)
   } else {
      knownHeaders[index] = value
   }
```

B. Client and Server Connection Abstraction

In accordance with an embodiment, a request processing component such as Loom supports concurrency of client-server communications with the use of virtual threads. Such virtual threads allow client HTTP applications to operate, e.g., request connections to server processes, in a normal blocking manner, while the underlying request processing (e.g., Loom-based) environment handles concurrency of request processing.

The ability to develop client applications with such a request processing component offers a simpler code development process. For example the application developer does not have to build in reactive programming within their application itself.

In accordance with an embodiment, to support testing of software applications or services, a client connection can be replaced, for testing purposes, with an in-memory implementation that does not invoke, e.g., HTTP, but instead exposes inverse-functions to a server connection; for example, data bytes written to a data writer of a client connection are available through a data reader on a server connection, and vice versa.

During testing, the in-memory implementation uses a blocking queue in memory, which emulates the use of an HTTP protocol, but without using actual sockets. Once such testing (e.g., a unit test), has been completed, the client and/or server code can be tested against actual network sockets (e.g., an integration test).

For example, it may be desired to create services that can be easily tested, without the need to rewrite the same test depending on whether the application developer will be performing a unit test, or an integration test. Usually the abstraction is quite complex, due to optimizations for performance, for example using an event loop mechanism, reactive code, etc.

The described approach enables improved testing or debugging; including that during testing or debugging, a thread dump provides more useful information for troubleshooting purposes.

Figure 14:
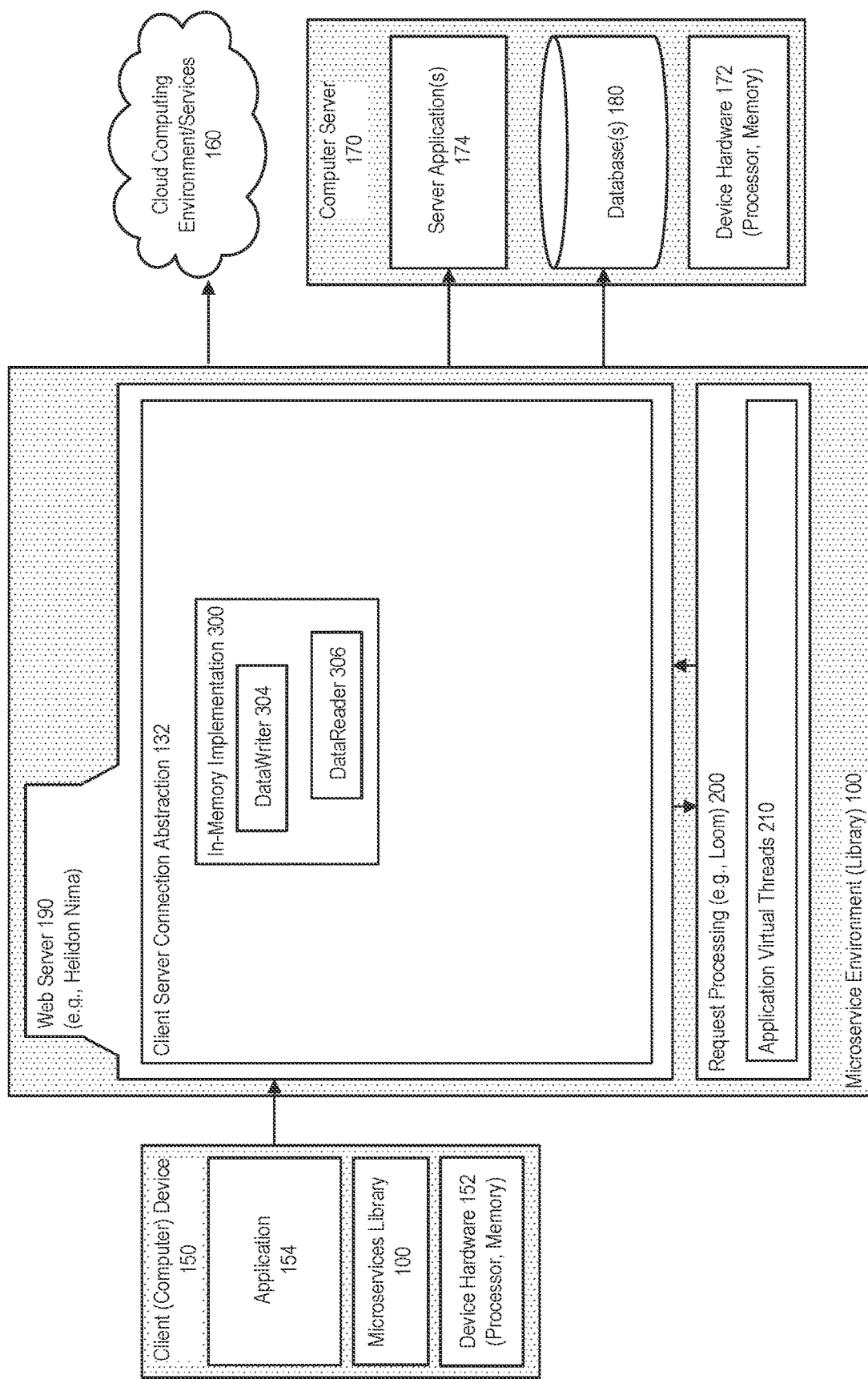
FIG. 14 illustrates support for client and server abstraction, in accordance with an embodiment.

FIG. 14 illustrates support for client and server abstraction, in accordance with an embodiment.

As illustrated in FIG. 14, in accordance with an embodiment, to support testing of software applications or services, a client connection can be replaced, for testing purposes, with an in-memory implementation 300 that does not invoke, e.g., HTTP, but instead exposes inverse-functions to a server connection; for example, data bytes written to a data writer 304 of a client connection are available through a data reader 306 on a server connection, and vice versa.

Figure 15:
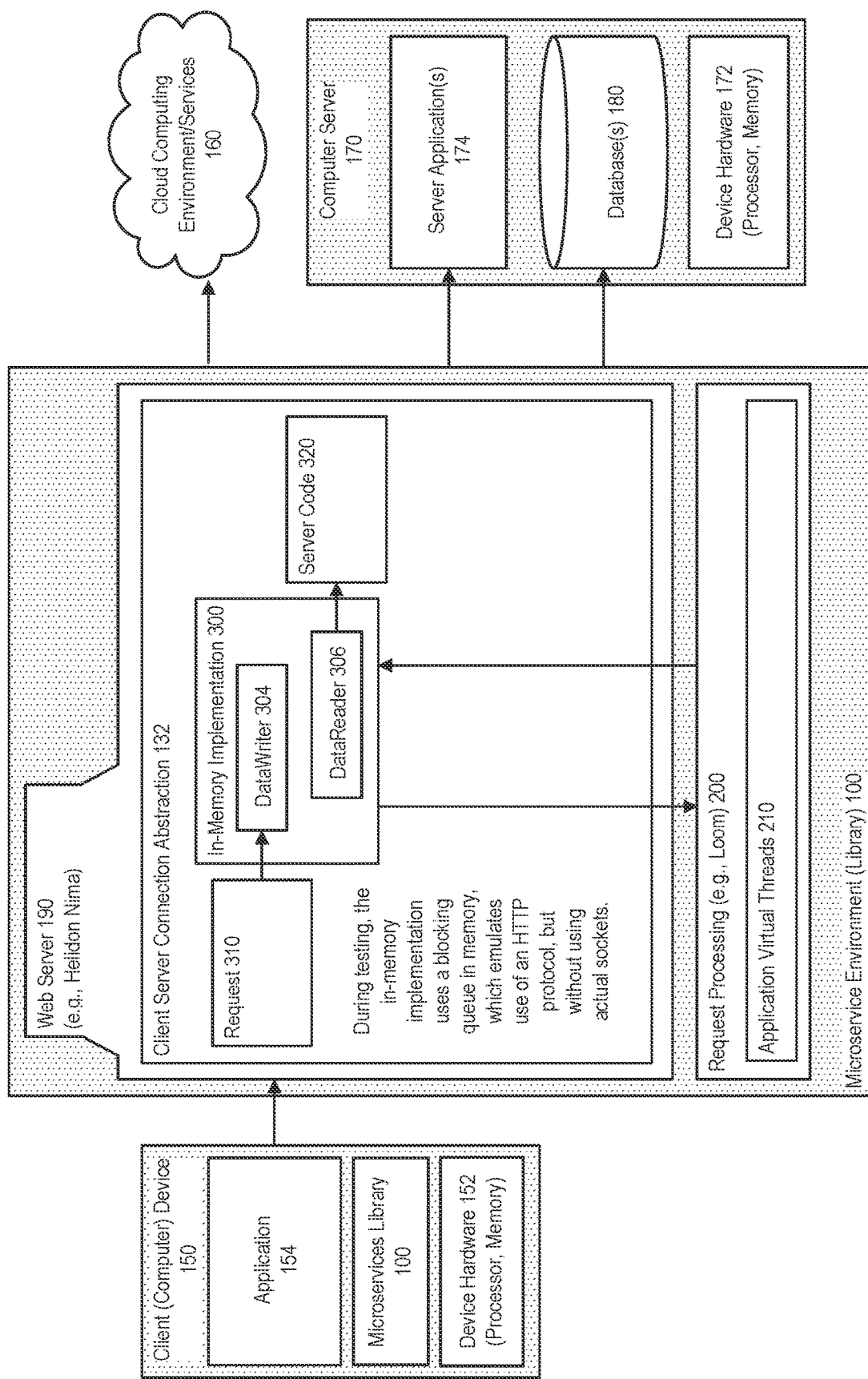
FIG. 15 further illustrates support for client and server abstraction, in accordance with an embodiment.

FIG. 15 further illustrates support for client and server abstraction, in accordance with an embodiment.

As illustrated in FIG. 15, in accordance with an embodiment, during testing (for example, in testing the process of a request 310 directed to a server code 320), the in-memory implementation uses a blocking queue in memory, which emulates the use of an HTTP protocol, but without using actual sockets.

Figure 16:
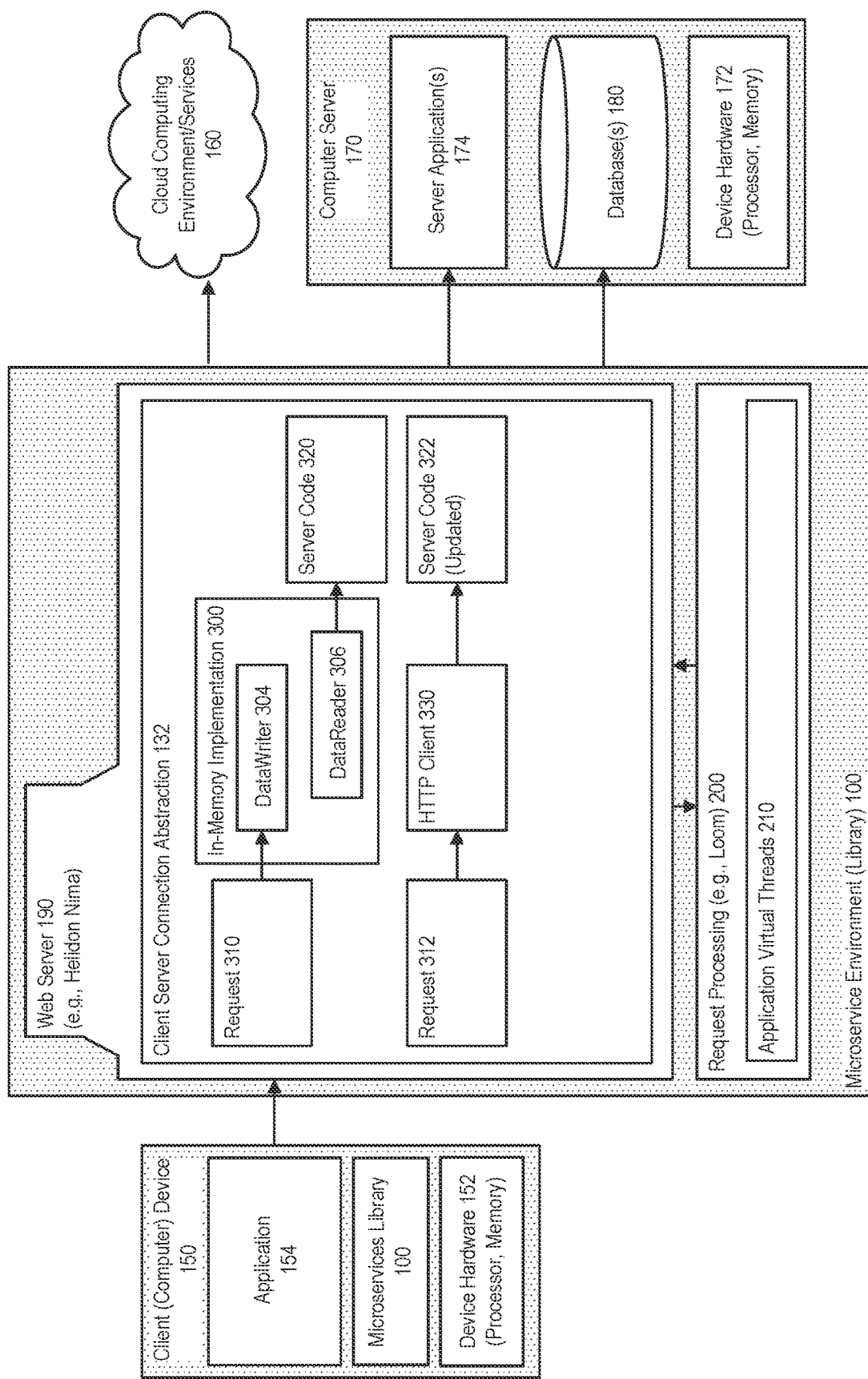
FIG. 16 further illustrates support for client and server abstraction, in accordance with an embodiment.

FIG. 16 further illustrates support for client and server abstraction, in accordance with an embodiment.

As illustrated in FIG. 16, in accordance with an embodiment, once the testing (e.g., a unit test, or an integration test), has been completed using the in-memory implementation, the client 330 and/or server code 322 can be tested against actual sockets, for use in processing a request 312.

Figure 17:
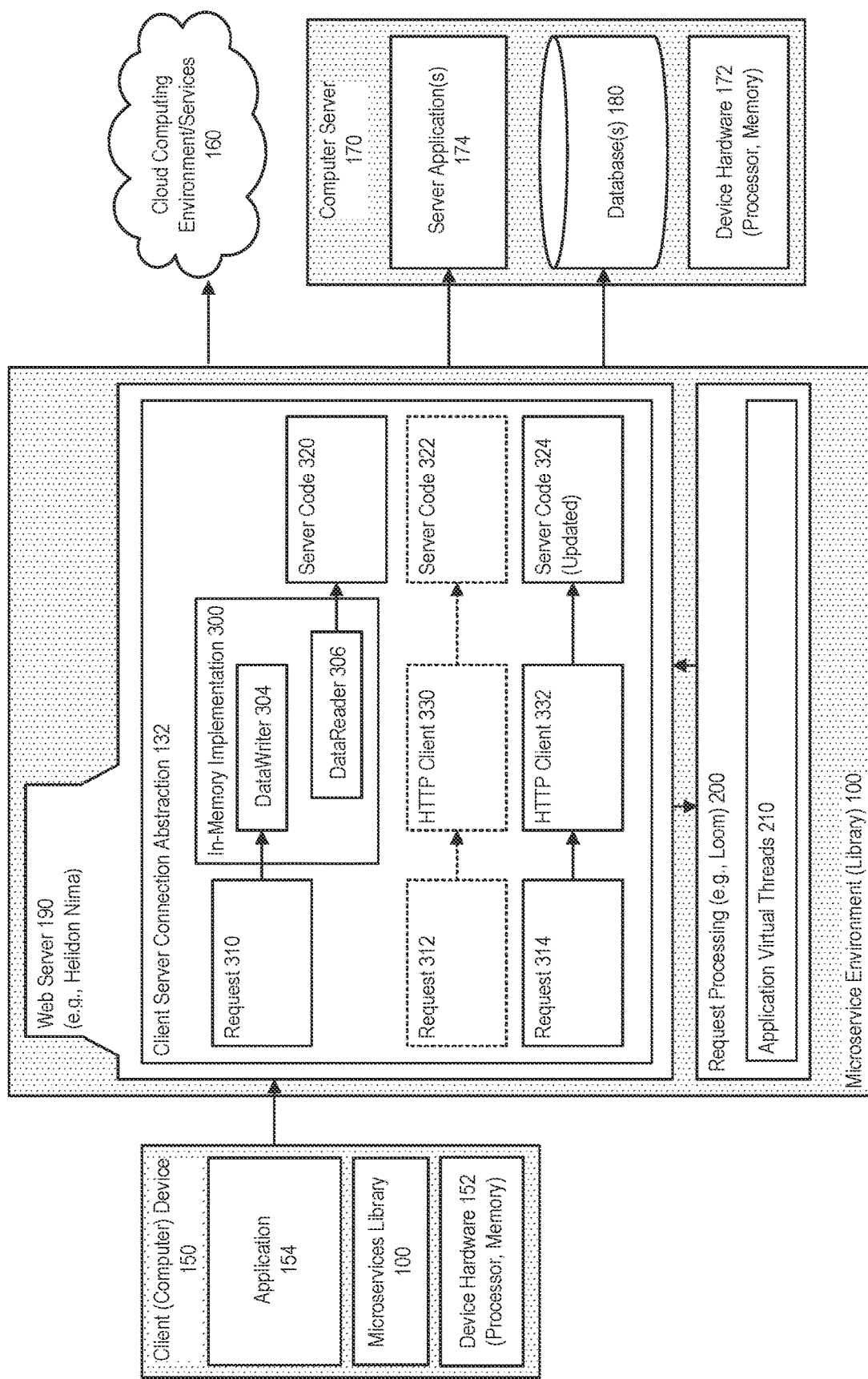
FIG. 17 further illustrates support for client and server abstraction, in accordance with an embodiment.

FIG. 17 further illustrates support for client and server abstraction, in accordance with an embodiment.

As illustrated in FIG. 17, in accordance with an embodiment, the process can be repeated, for example to update the server code 324, perform testing against an in-memory implementation that uses a blocking queue in memory, and implement the client 332 against actual sockets, for use in processing a request 314.

In accordance with an embodiment, the system abstracts a connection to two basic operations: (1) it can be written to, using a data writer (DataWriter); and (2) it can be read from, using a data reader (DataReader).

In accordance with an embodiment, the system allows an application developer to replace a client connection with an in-memory implementation that will not invoke network socket communication, but exposes inverse functions to server connection (bytes written to the data writer of client connection are available through the data reader on server connection, and vice versa).

In accordance with an embodiment, this allows the application developer to write a single application code to test server code, and by simply switching between an actual or real HTTP client and an in-memory HTTP client, the application developer can test both the validity of the routing code in a unit test, and the validity of the whole server code using an integration test (e.g., opening a port and invoking it over HTTP protocol).

In accordance with an embodiment, examples of tests that would use this include: a unit test that creates an instance of DirectClient that implements HTTP1Client, which uses the in-memory connection abstraction; an integration test that creates an instance of HTTP1Client, which connects over the network; or an abstract class that gets an instance of HTTP1Client and defines actual tests, such as, for example:

```
@Test
void testHealthObserver( ) {
  try (Http1ClientResponse response
  = client.get("/observe/health").request( )) {
    assertThat(response.status( ), is (Http.Status.NO_CONTENT_204));
  }
}
```

In accordance with an embodiment, the system can provide support for various interfaces, classes, or methods, as illustrated below.

In accordance with an embodiment, an abstraction that can provide bytes (DataReader) can be provided as a data reader that can pull additional data, for example:

```
DataReader {
  /**
   * Data reader from a supplier of bytes.
   * @param bytesSupplier supplier that can be pulled for more data,
   * regardless of its source(network, or memory)
   */
  DataReader(Supplier<byte[ ]> bytesSupplier)
  /**
   * Number of bytes available in the currently pulled data.
   * @return number of bytes available
   */
  int available( )
  /**
   * Pull next data.
   */
  void pullData
  /**
   * Skip n bytes.
   * @param lenToSkip number of bytes to skip(must be less or
   * equal to current capacity)
   */
  void skip(int lenToSkip)
  /**
   * Ensure we have at least one byte available.
   */
  void ensureAvailable( )
  /**
   * Read 1 byte.
   * @return next byte
   */
  byte read( )
  /**
   * Read next buffer.
   * Will read {#available( )} number of bytes into a buffer and move position.
   * @return buffer data wrapping the available bytes
   */
  BufferData readBuffer( )
  /**
   * Read next buffer of defined size. Will pull additional data if length
   * is not available.
   * Will move position.
   * @param length length of data to read
   * @return buffer data with the length requested
   */
  BufferData readBuffer(int length)
```

In accordance with an embodiment, an abstraction that can consume bytes (DataWriter) can be provided as a data writer than can write data to the underlying transport (e.g., a socket), for example:

```
interface DataWriter {
  /**
   * Write buffers, may delay writing and may write on a different thread.
   * This method also may combine multiple calls into a single write to
   * the underlying transport.
   * @param buffers buffers to write
   */
  void write(BufferData... buffers)
}
```

In accordance with an embodiment, an abstraction of a connection of a client (ClientConnection) that allows usage of a custom connection for testing, can be provided as, for example:

```
interface ClientConnection {
  /**
   * Data reader providing response bytes.
   * @return reader to read from this connection
   */
  DataReader reader( );
  /**
   * Data writer the client request writes to.
   * @return writer to write to this connection
   */
  DataWriter writer( );
}
```

In accordance with an embodiment, an implementation for an in-memory client connection (DirectClientConnection)—can be provided, such a connection would directly route to server side routing, bypassing the network protocol, for example:

```
class DirectClientConnection implements ClientConnection {
  Router router;
  DataReader clientReader;
  DataWriter clientWriter;
  DataReader serverReader;
  DataWriter serverWriter;
  DirectClientConnection(Router router)
    this.router = router;
    var serverToClient = new ArrayBlockingQueue<>(1024);
    var clientToServer = new ArrayBlockingQueue<>(1024);
    this.clientReader = reader(serverToClient);
    this.clientWriter = writer(clientToServer);
    this.serverReader = reader(clientToServer);
    this.serverWriter = writer(serverToClient);
  }
  @override
  public DataReader reader( ) {
    return clientReader;
  }
  @override
  public DataWriter writer( ) {
    return clientWriter;
  }
  private DataWriter writer(ArrayBlockingQueue<byte[ ]> queue) {
    return new DataWriter( ) {
      @Override
      public void write(BufferData... buffers) {
        for(BufferData buffer : buffers) {
          write(buffer);
        }
      }
      write(BufferData buffer) {
        byte[ ] bytes = new byte [buffer.available( )];
        buffer.read(bytes);
        try {
          queue.put(bytes);
        } catch(InterruptedException e) {
          throw new IllegalStateException("Thread interrupted", e);
        }
      }
    };
  }
  private DataReader reader(ArrayBlockingQueue<byte[ ]> queue) {
    return new DataReader(( ) -> {
      byte[ ] data;
      try {
        data = queue.take( );
      } catch(InterruptedException e) {
        throw new IllegalArgumentException("Thread interrupted", e);
      }
      if(data.length == 0) {
        return null;
      }
      return data;
    });
  }
}
```

In accordance with an embodiment, an implementation for an over-the-network connection for HTTP/1.1 that uses a reader and writer with a network socket, instead of an in-memory array, can be provided as, for example:

```
class Http1ClientConnection implements ClientConnection {
  private DataReader reader;
  private DataWriter writer;
  private String host;
  private int port;
  @Override
  public DataReader reader( ) {
    return reader;
  }
  @Override
  public DataWriter writer( ) {
    return writer;
  }
  Http1ClientConnection connect( ) {
    try {
      socket = new Socket( );
      socket.connect(new InetSocketAddress(host, port),
          (int) options.connectTimeout( ).toMillis( ));
    } catch(IOException e) {
      throw new UncheckedIOException("Could not connect to
      " + host + ":" + port, e);
    }
    var helidoSocket = createSocket(socket);
    // to wrap input and output streams
    this.reader = new DataReader(helidonSocket);
    this.writer = new DataWriter( ) {
      @override
      public void write(BufferData... buffers) {
        for(BufferData buffer : buffers) {
```

```
        write(buffer);
      }
    }
    void write(BufferData buffer) {
      helidonSocket.write(buffer);
    }
  };
  return this;
  }
}
```

In accordance with an embodiment, a communication between a client and a server can be abstracted for the client into various components: a ClientConnection (as described above), and for request/response based protocols a ClientRequest, and ClientResponse.

In accordance with an embodiment, a communication between a client and a server can be abstracted for the server into various components: a ServerConnection, and for request/response based protocols a ServerRequest, and ServerResponse.

When implementing a client, the developer can choose a connection to use with a new ClientRequest, providing either a network based connection, or an in-memory connection.

When implementing a client that is not based on request/response paradigm (such as WebSocket protocol that uses a concept of listeners), the client handles the abstraction directly, and invokes the server listeners in memory when in-memory connection is used, or calls a server over the network to handle server side listeners. A direct WebSocket client using in-memory communication, can be provided as, for example:

```
DirectWsClient implements WsClient {
    WsRouting routing; // WebSocket routing, see routing abstraction invention
    // connect in memory, using the provided client listener
    connect(URI uri, WsListener listener) {
      HttpPrologue prologue = HttpPrologue.create("ws", "ws", ...)
      WsRoute route = routing.findRoute(prologue);
      // discover the WebSocket route to use
      // create the in-memory connection between client listener and server route
      DirectWsConnection conn = DirectWsConnection.create(prologoue, listener, route);
      conn.start( ); // start the communication
    }
}
```

In accordance with an embodiment, a method connection that uses the implementation for an over-the-network WebSocket client connection (WsClientlmpl) can be provided as, for example:

```
DirectWsClient implements WsClient {
    connect(URI uri, WsListener listener) {
      Socket socket = new Socket( );
      Socket.connect(uri.getHost( ), uri.getPort( ));
      var helidonSocket = helidonSocket(socket);
      handleUpgradeToWs(helidonSocket);
      ClientWsConnection session = new ClientWsConnection(listener, helidonSocket);
      // run the client/server session on an executor, such as
      // a VirtualThread executor
      executor( ).submit(session);
    }
}
```

In accordance with an embodiment, a server-side equivalent (ConnectionContext), which uses data writer and data reader to be used by server connections, can be provided as, for example:

```
public interface ConnectionContext extends SocketContext {
    /**
     * Data writer to write response bytes.
     * @return data writer
     */
    DataWriter dataWriter( );
    /**
     * Data reader to read request bytes.
     * @return data reader
     */
    DataReader dataReader( );
    /**
     * Router that may contain routings of different types(HTTP,
     * WebSocket, grpc) .
     * @return router
     */
    Router router( );
}
```

The above examples are provided for purposes of illustration; in accordance with various embodiments other examples of interfaces, classes, or methods, can be provided.

Figure 18:
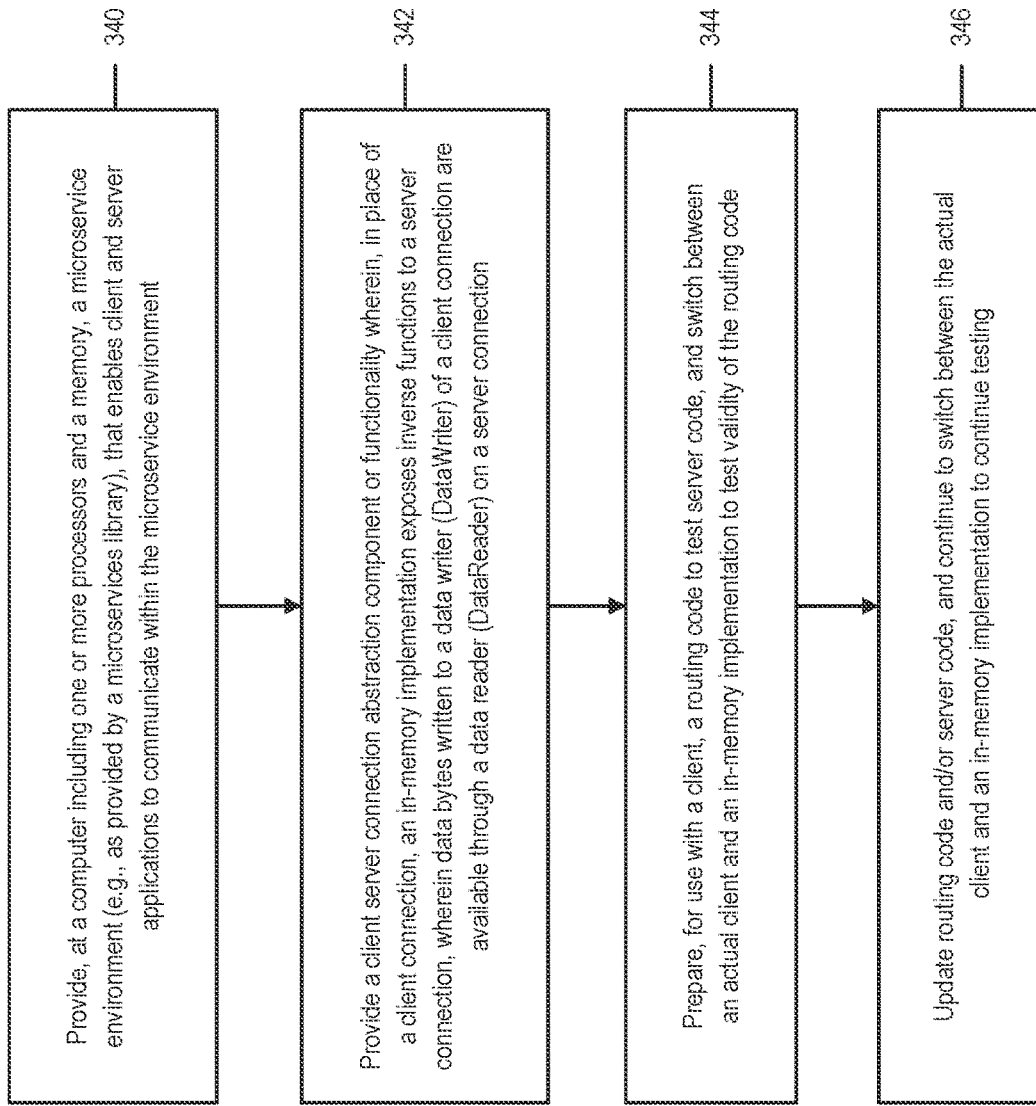
FIG. 18 illustrates a method for use with a microservice environment, for providing client and server abstraction, in accordance with an embodiment.

FIG. 18 illustrates a method for use with a microservice environment, for providing client and server abstraction, in accordance with an embodiment.

As illustrated in FIG. 18, in accordance with an embodiment, at step 340, at a computer including one or more processors and a memory, a microservice environment (e.g., as provided by a microservices library) is provided, that enables client and server applications to communicate within the microservice environment.

At step 342, the system provides a client server connection abstraction component or functionality wherein, in place of a client connection, an in-memory implementation exposes inverse functions to an, e.g., HTTP, server connec tion, wherein data bytes written to a data writer (DataWriter) of a client connection are available through a data reader (DataReader) on a server connection.

At step 344, a user can prepare, for use with an, e.g., HTTP, client, a routing code to test server code, and switch between an actual or real client and an in-memory implementation of the client to test validity of the routing code.

At step 346, the user can update routing code and/or server code, and continue to switch between the actual or real client and an in-memory implementation to continue testing.

Example Interface

In accordance with an embodiment, a ClientConnection interface (an example of which is illustrated above) can be used to provide a client connection that allows usage of a custom connection for testing.

C. Router Abstraction

Within a cloud environment that supports client-server communications via different communication protocols, each communication protocol may have its own requirements as to the formatting of messages passed between the participants, including message headers.

For example, the HTTP/1 and HTTP/2 protocols have different requirements as to the format of message headers used when sending request or response messages via those protocols.

In accordance with an embodiment, the system enables configuration of a server that can operate to serve requests via multiple network or communication protocols, such as for example HTTP1, gRPC over HTTP2, and/or WebSocket.

A route abstraction allows each protocol to have its own routing, e.g., an HTTP routing. A sub-abstraction can provide a more specific route, for example as an HTTP1 route, or an HTTP2 route. For a connection/request received via a particular protocol, the system can pick up the appropriate route for the request, and process it accordingly.

For example, it may be desirable to have routing configured on a server builder that can handle any supported protocol, without a dependency on each protocol implementation. This requires an abstraction of the router and various routings that allows the application developer to add a new routing to the server. For example in a Java environment such an abstraction can be provided simply by adding a library on the classpath. Other implementations may support HTTP routing over multiple protocol versions, yet without the capability to create a version specific route. Additionally some implementations require specific handling depending on protocol version that is required by the user, or explicit dependency on these protocols.

The described approach enables an easy-to-define configuration of a server to support multiple protocols.

Figure 19:
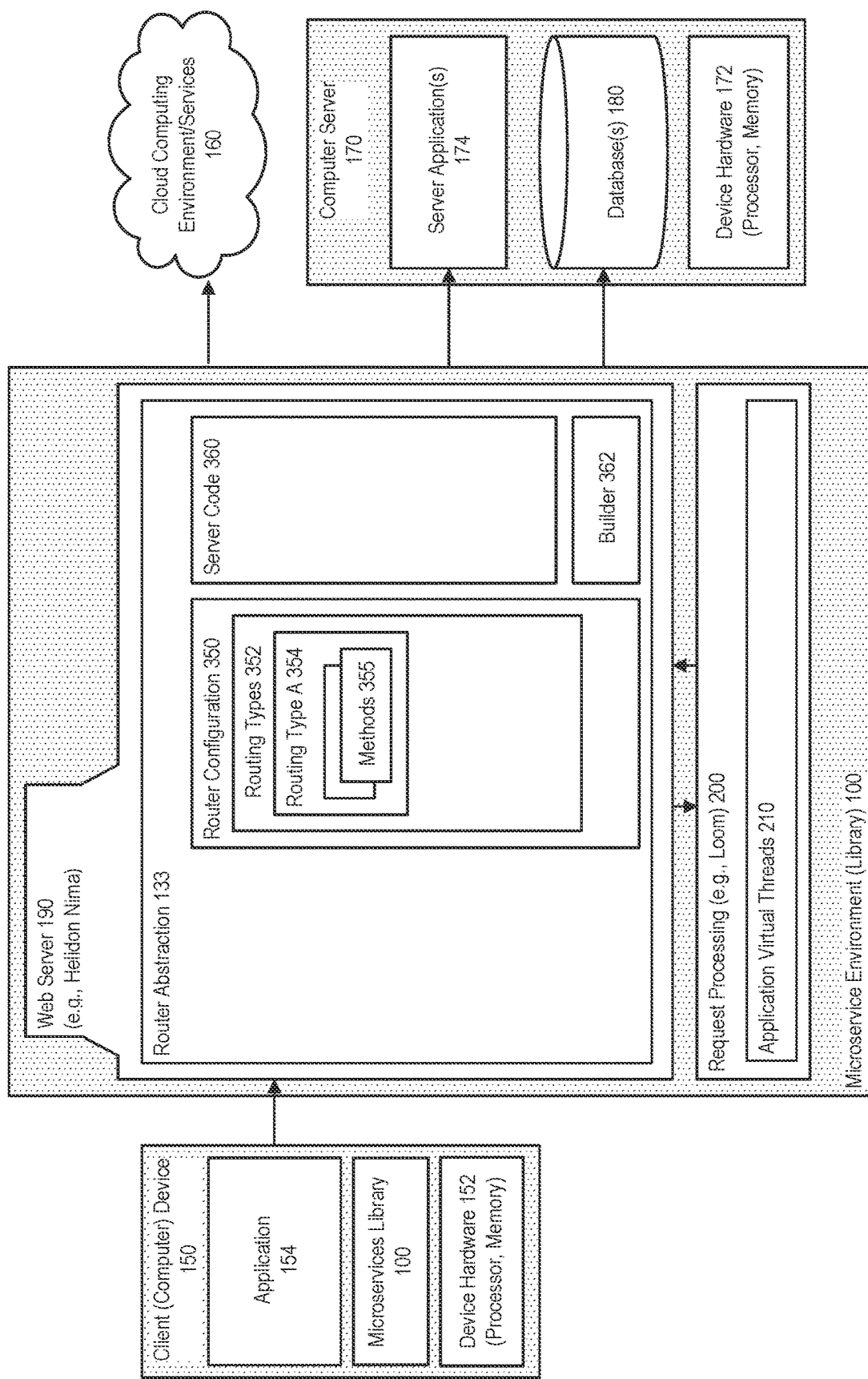
FIG. 19 illustrates support for router abstraction, in accordance with an embodiment.

FIG. 19 illustrates support for router abstraction, in accordance with an embodiment.

As illustrated in FIG. 19, in accordance with an embodiment, the system enables configuration 350 of a server that can operate to serve requests via multiple network or communication protocols, each of which are associated with routing types 352, for example a routing type A 354 having methods 355, for use with a server code 360 and builder 362.

A route abstraction allows each protocol to have its own routing, e.g., an HTTP routing. A sub-abstraction can provide a more specific route, for example as an HTTP/1 route, or an HTTP/2 route. For a request message received via a particular protocol, the system can pick up the appropriate route for the request, and process it accordingly.

Figure 20:
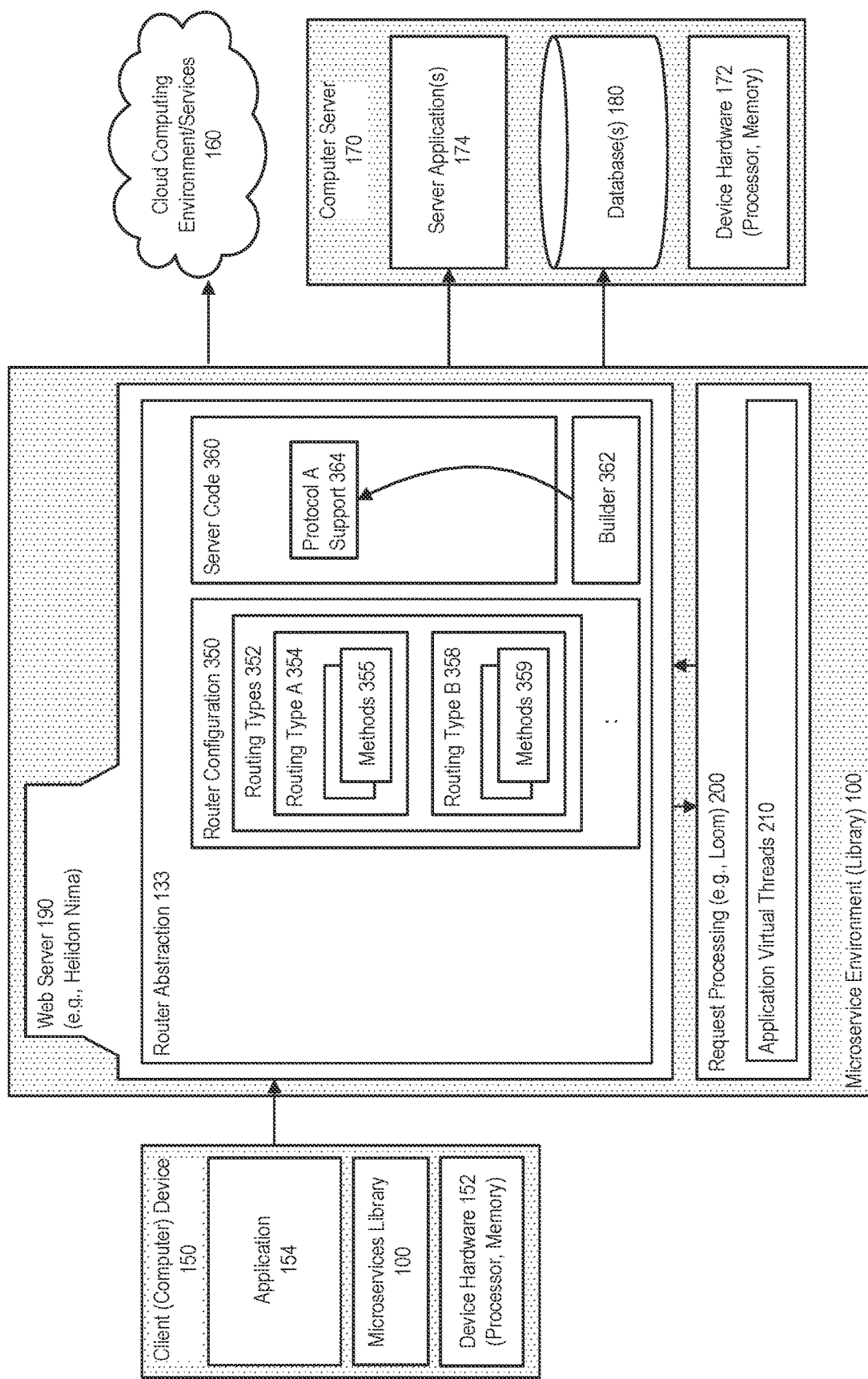
FIG. 20 further illustrates support for router abstraction, in accordance with an embodiment.

FIG. 20 further illustrates support for router abstraction, in accordance with an embodiment.

As illustrated in FIG. 20, in accordance with an embodiment, the builder can provide protocol support 364 within the server code for a first protocol A. The system similarly enables configuration of the server to support a routing type B 358 having methods 359, for use with the server code.

Figure 21:
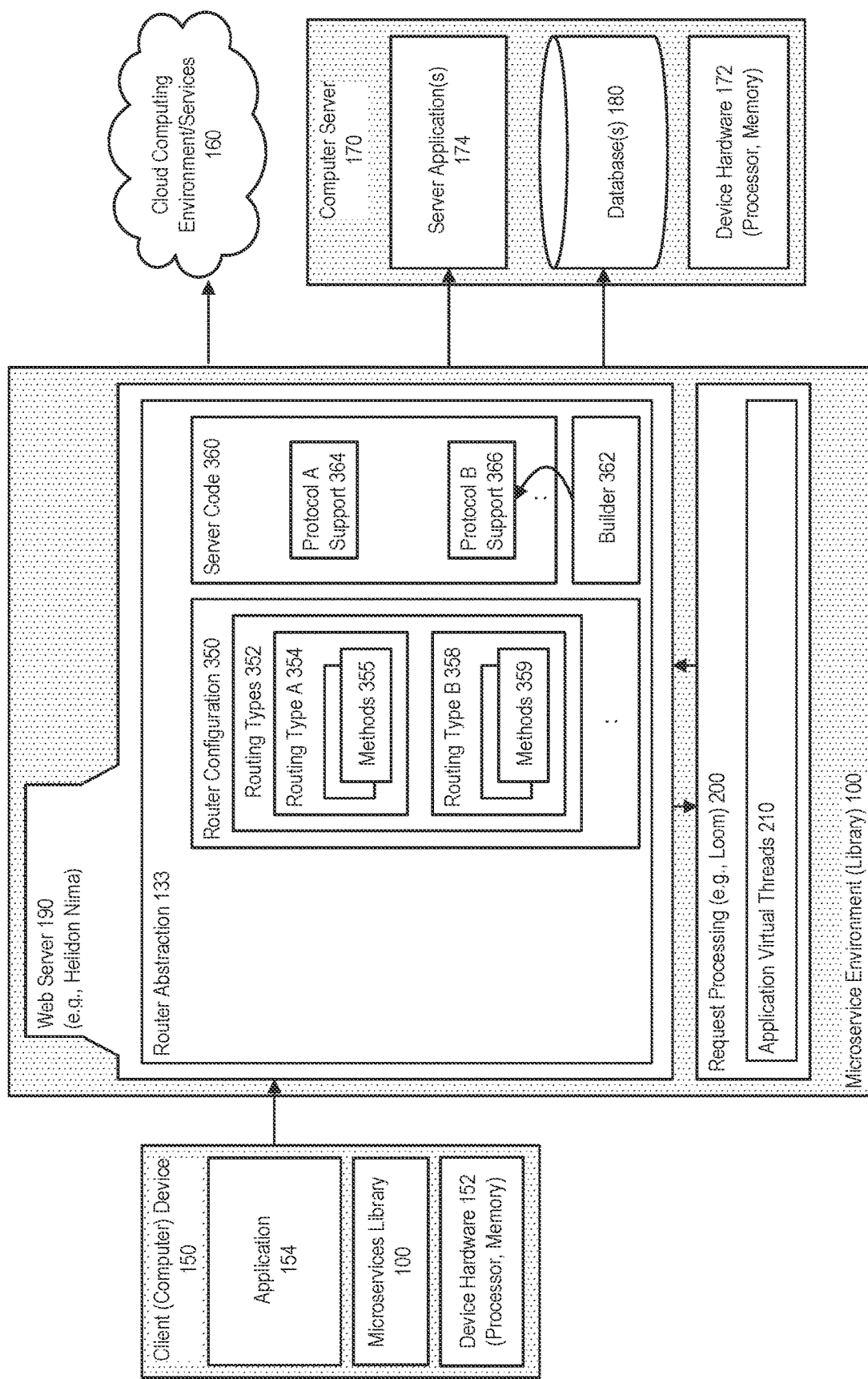
FIG. 21 further illustrates support for router abstraction, in accordance with an embodiment.

FIG. 21 further illustrates support for router abstraction, in accordance with an embodiment.

As illustrated in FIG. 21, in accordance with an embodiment, the builder can provide protocol support 366 within the server code for a second protocol B.

Figure 22:
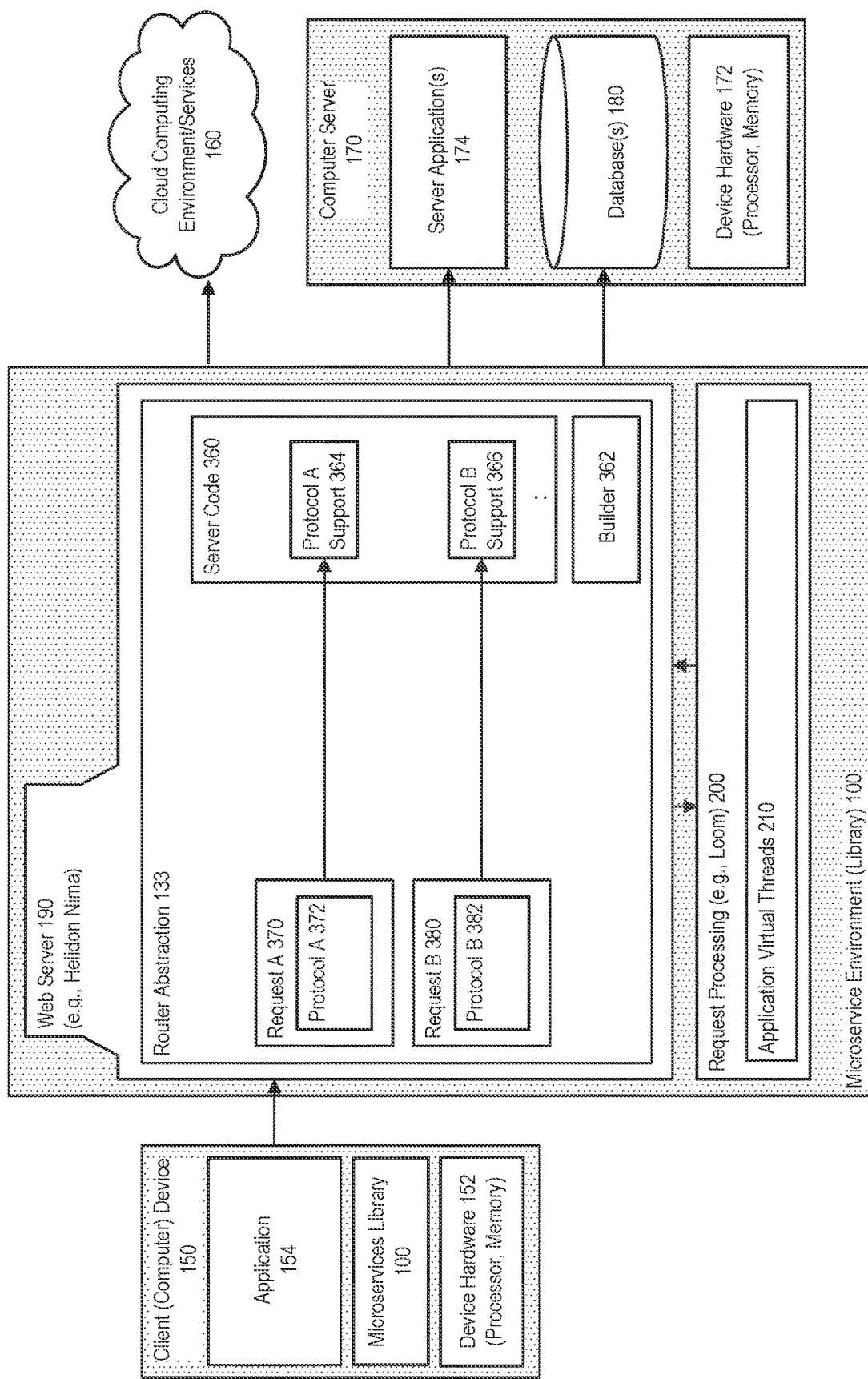
FIG. 22 further illustrates support for router abstraction, in accordance with an embodiment.

FIG. 22 further illustrates support for router abstraction, in accordance with an embodiment.

As illustrated in FIG. 22, in accordance with an embodiment, the server as configured can operate to serve requests via multiple network or communication protocols, such as, for example, a request A 370 using protocol A 372; and a request B 380 using protocol B 382.

For example, in accordance with an embodiment, this routing abstraction supports routing for any HTTP version, with the capability to create HTTP version specific routes. Routes for other types of protocols can be added that, e.g., upgrade from HTTP (such as WebSocket), that are a subset of HTTP (such as gRPC), or even unrelated to HTTP.

In accordance with an embodiment, this is achieved by abstracting a router (Router), that can contain multiple types of routings. When setting up the server, the application developer can register routings with its builder. A routing then contains protocol-specific methods to enable configuration of that protocol. The combination of these will create a single server that is capable of serving requests to all supported protocols using a single router configuration, for example:

```
.addRouting(HttpRouting.builder( )
.get("/",(req, res) -> res.send("Hello World"))
.route(Http1Route.route(GET, "/http1",(req, res)
    -> res.send("Hello World 1")) )
.route(Http2Route.route(GET, "/http2",(req, res)
    -> res.send("Hello World 2")) ))
.addRouting(GrpcRouting.builder( )
.unary(Strings. getDescriptor( ) ,
"StringService",
"Upper",
ProtocolsMain: :grpcUpper))
.addRouting(WebSocketRouting.builder( )
.endpoint("/websocket/echo", ProtocolsMain::wsEcho))
```

In accordance with an embodiment, various advantages of the described approach can include, for example, the ability to combine protocols in the same server. The protocol is a separate module and there is no dependency from the routing API to each protocol implementation (e.g., add additional protocols and their routes without modification to the server). HTTP routes can be created that are served by any HTTP version (the "I" route in the example shown above), or have HTTP version specific routes (the "/http1" and "/http2" routes in the example shown above). The approach provides a full abstraction of HTTP version from the user—the code can be fully agnostic of version. The approach also provides an extensible mechanism, so for example, to support HTTP/3, it should not be required to modify the routing code.

In accordance with an embodiment, the system can provide support for various interfaces, classes, or methods, as illustrated below.

In accordance with an embodiment, a router interface (Router) can be used to set up routing, can contain more than one protocol routing. Methods can include, for example: routing (Class<T>, T)—to obtain a routing of a specific type, wherein the router for server contains routings of various types, so the server can handle each protocol as fast as possible. For example:

```
public interface Router {
  /**
   * Get routing of a specific type.
   * @param routingType type of the routing
   * @param defaultValue default value to use if the routing is not defined
   * in this router
   * @param <T> type of routing
   * @return routing defined or default value if not found
   */
  <T extends Routing> T routing(Class<T> routingType, T defaultValue);
  /**
   * Builder for a standalone router.
   */
  interface Builder {
    /**
     * Add a new routing to this router.
     * @param routing routing to add, such as
     * {@code webserver.http.HttpRouting}
     * @return updated builder
     */
    B addRouting(Routing routing);
  }
}
```

In accordance with an embodiment, a routing marker interface (Routing) can be provided as, for example:

```
/**
 * Routing abstraction.
 */
```

```
public interface Routing {
}
```

In accordance with an embodiment, an HTTP routing implementation (HttpRouting), wherein the routing is capable of handling any HTTP version, can be provided as, for example:

```
public final class HttpRouting implements Routing {
  private final ServiceRoute rootRoute;
  private HttpRouting(Builder builder) {
    this.rootRoute = builder.rootRules.build( );
  }
  /**
   * Creates new instance of {io.webserver.http.HttpRouting.Builder
   * router builder}.
   * @return a new instance
   */
  public static Builder builder( ) {
    return new Builder( );
  }
  /**
   * Route a request.
   * Handler HTTP filters and finds a route.
   * @param ctx context
   * @param request routing request
   * @param response routing response
   */
  public void route(ConnectionContext ctx, RoutingRequest request,
        RoutingResponse response) {
      HttpPrologue prologue = request.prologue( );
      RoutingResult result = RoutingResult.ROUTE;
      int counter = 0;
      while(result == RoutingResult.ROUTE) {
      counter++;
        if(counter == 10) {
          LOGGER.log(System.Logger.Level.ERROR,
            "Rerouted more than 10 times. Will not attempt further routing");
          throw HttpException.builder( )
            .request(HttpSimpleRequest.create(prologue,
            request.headers( )))
```

```
              .type(SimpleHandler.EventType.INTERNAL_ERROR)
              .build( );
        }
        result = doRoute(ctx, request, response);
      }
      // finished and done
      if(result == RoutingResult.FINISH) {
        return;
      }
      throw HttpException.builder( )
          .request(request)
          .response(response)
          .type(SimpleHandler.EventType.NOT_FOUND)
          .message("Endpoint not found")
          .build( );
    }
    private RoutingResult doRoute(ConnectionContext ctx, RoutingRequest request,
      RoutingResponse response) {
      HttpPrologue prologue = request.prologue( );
      RouteCrawler crawler = rootRoute.crawler(ctx, request);
      while(crawler.hasNext( )) {
        response.resetRouting( );
        RouteCrawler.CrawlerItem next = crawler.next( );
        request.path(next.path( ));
        try {
          next.handler( ).handle(request, response);
          if(response.shouldReroute( )) {
            if(response.isSent( )) {
              return RoutingResult.FINISH;
            }
            HttpPrologue newPrologue = response.reroutePrologue(prologue);
            request.prologue(newPrologue);
            response.resetRouting( );
            return RoutingResult.ROUTE;
          }
          if(response.isNexted( )) {
            if(response.isSent( )) {
              return RoutingResult.FINISH;
            }
            continue;
          }
          if(!response.hasEntity( )) {
            // not texted, not rerouted - just send it!
            response.send( );
          }
          return RoutingResult.FINISH;
        } catch(CloseConnectionException | HttpException e) {
          throw e;
        } catch(Exception thrown) {
          if(thrown.getCause( ) instanceof SocketException se) {
            throw new UncheckedIOException(se);
          }
          if(!response.isSent( )) {
            boolean keepAlive = true;
            try {
              request.content( ).consume( );
            } catch(Exception e) {
              keepAlive = request.content( ).consumed( );
            }
            // we must close connection, as we could not consume request
            throw HttpException.builder( )
                .type(SimpleHandler.EventType.INTERNAL_ERROR)
                .cause(thrown)
                .request(request)
                .response(response)
                .message(thrown.getMessage( ))
                .setKeepAlive(keepAlive)
                .build( );
          }
        }
      }
      return RoutingResult.NONE;
    }
    private enum RoutingResult {
      ROUTE,
      FINISH,
      NONE,
    }
/**
```

-continued

```
* Fluent API builder for {io.webserver.http.HttpRouting}.
*/
public static class Builder implements HttpRules,
    common. Builder<Builder, HttpRouting> {
    private final ServiceRules rootRules = new ServiceRules( );
    private Builder( ) {
    }
    @override
    public HttpRouting build( ) {
        return new HttpRouting(this);
    }
    @Override
    public Builder route(HttpRoute route) {
        rootRules.route(route);
        return this;
    }
    @override
    public Builder route(Http.Method method, String pathPattern,
        Handler handler) {
        return route(HttpRoute. builder( )
            .methods(method)
            .path(pathPattern)
            .handler(handler));
    }
    /**
     * Add a get route.
     * @param pathPattern path pattern
     * @param handler handler to use
     * @return updated builder
     */
    public Builder get(String pathPattern, Handler handler) {
        return route(HttpRoute.builder( )
            .methods(Http.Method.GET)
            .path(pathPattern)
            .handler(handler));
    }
}
```

In accordance with an embodiment, an HTTP service abstraction (HttpService) provides a logical grouping of routes that form a single unit, for example:

```
/**
 * Encapsulates a set of {HttpRouting routing} rules and related logic.
 * <p>
 * Instance can be assigned to the {HttpRouting routing} using
 * {HttpRouting.Builder#register(java.util.function.Supplier [ ])} methods.
 */
@FunctionalInterface
public interface HttpService {
    /**
```

-continued

```
     * Updates the routing to add handlers of this service.
     * @param rules to update
     */
    void routing(HttpRules rules);
}
```

In accordance with an embodiment, an HTTP route abstraction (HttpRoute) provides a combination of a path expression, HTTP method predicate, and a handler that handles matching requests, including a basic HTTP route (should be usable by any HTTP protocol version, for example:

```
public interface HttpRoute extends Route {
    /**
     * Builder to build a new HTTP route.
     * @return builder
     */
    static HttpRouteImpl.Builder builder( ) {
        return new Builder( );
    }
    /**
     * Whether this route accept the provided request.
     * @param prologue prologue of the request
     * @return result of the validation
     * @see PathMatchers.MatchResult#notAccepted( )
     */
    PathMatchers.MatchResult accepts(HttpPrologue prologue);
    /**
     * Handler of this route.
     * @return handler
     */
    Handler handler( );
```

```
/**
 * Fluent API builder for {io.webserver.http.HttpRoute}.
 */
class Builder implements common.Builder<Builder, HttpRoute> {
    private Predicate<Http.Method> methodPredicate = Http.Method.predicate( );
    private PathMatcher pathMatcher = PathMatchers.any( );
    private Handler handler;
    private Builder( ) {
    }
    @Override
    public HttpRoute build( ) {
        Objects.requireNonNull(handler, "Handler must be provided");
        return new HttpRouteImpl(this);
    }
    /**
     * HTTP methods this route should handle.
     * @param methods methods to handle
     * @return updated builder
     */
    public Builder methods(Http.Method... methods) {
        return methods( Http.Method.predicate(methods));
    }
    /**
     * Method predicate to use.
     * @param methodPredicate method predicate
     * @return updated builder
     */
    public Builder methods(Predicate<Http.Method> methodPredicate) {
        this.methodPredicate = methodPredicate;
        return this;
    }
    /**
     * Path pattern to handle.
     * @param pathPattern path pattern
     * @return updated builder
     */
    public Builder path(String pathPattern)
        return this.path(PathMatchers.create(pathPattern));
    }
    /**
     * Path matcher to handle path.
     * @param pathMatcher path matcher
     * @return updated builder
     */
    public Builder path(PathMatcher pathMatcher) {
        this.pathMatcher = pathMatcher;
        return this;
    }
    /**
     * Handler to use.
     * @param handler handler
     * @return updated builder
     */
    public Builder handler(Handler handler) {
        this.handler = handler;
        return this;
    }
    Predicate<Http.Method> methodPredicate( ) {
      return methodPredicate;
    }
    PathMatcher pathPredicate( ) {
      return pathMatcher;
    }
    Handler handler( ) {
      return handler;
    }
  }
}
```

In accordance with an embodiment the system can support multiple implementations, for example, a HTTP/1 specific route implementation (Http1Route):

```
/**
 * Create an HTTP/1 specific route.
 * @param method accepted method
 * @param path path pattern
 * @param handler handler
 * @return a new HTTP/1.1 specific route
 */
public static Http1Route route(Http.Method method, String path,
```

```
            Handler handler) {
                return new Http1Route(Http.Method.predicate(method),
                    PathMatchers.create(path), handler);
        }
        @override
        public PathMatchers.MatchResult accepts(HttpPrologue prologue) {
                if(!prologue.protocolVersion( ).equals("1.1")) {
                    return PathMatchers.MatchResult.notAccepted( );
                }
                if(!methodPredicate.test(prologue.method( ))) {
                    return PathMatchers.MatchResult.notAccepted( );
                }
                return pathMatcher. match(prologue.uriPath( ));
        }
        @Override
        public Handler handler( ) {
            return handler;
        }
        @Override
        public void beforeStart( ) {
            handler.beforeStart( );
        }
        @Override
        public void afterStop( ) {
            handler.afterStop( );
        }
}
```

Similarly, in accordance with an embodiment, the system can support a HTTP/2 specific route implementation (Http2Route), for example:

```
    /**
     * Create a new HTTP/2 only route.
     * @param method method to handle
     * @param path path pattern
     * @param handler handler
     * @return a new route
     */
    public static Http2Route route (Http.Method method, String path,
        Handler handler) {
            return new Http2Route (Http.Method.predicate (method) ,
                PathMatchers.create (path), handler) ;
    }
    @override
    public PathMatchers.MatchResult accepts (HttpPrologue prologue) {
            if (!prologue.protocolVersion ( ) .equals ("2.0") ) {
                return PathMatchers.MatchResult.notAccepted ( ) ;
            }
            if (!methodPredicate.test (prologue.method ( ) ) ) {
                return PathMatchers.MatchResult. notAccepted ( ) ;
            }
            return pathMatcher.match (prologue.uriPath ( ) ) ;
    }
    @Override
    public Handler handler ( ) {
        return handler;
    }
    @override
    public void beforeStart ( ) {
       handler.beforeStart ( ) ;
    }
    @Override
    public void afterStop ( ) {
       handler.afterStop ( ) ;
    }
}
```

In accordance with an embodiment, a WebSocket routing implementation (WebSocketRouting) providing a WebSocket-specific routing, can be provided as, for example:

```
public class WebSocketRouting implements Routing {
    private final List<WebSocket> routes;
    private WebSocketRouting (Builder builder) {
        this.routes = new ArrayList<> (builder.routes) ;
    }
    /**
     * Builder for WebSocket routing.
     * @return new builder
     */
    public static Builder builder ( ) {
        return new Builder ( ) ;
    }
    WebSocket findRoute (HttpPrologue prologue) {
        for (WebSocket route : routes) {
            PathMatchers.MatchResult accepts = route.accepts (prologue) ;
            if (accepts.accepted ( ) ) {
                return route;
            }
        }
        return null;
    }
    /**
     * Fluent API builder for {websocket.webserver.WebSocketRouting} .
     */
    public static class Builder implements common.Builder<Builder,
        WebSocketRouting> {
            private final List<WebSocket> routes = new ArrayList<> ( ) ;
            private Builder ( ) {
            }
            @Override
            public WebSocketRouting build ( ) {
                return new WebSocketRouting (this) ;
            }
            /**
             * Add endpoint.
             * @param path path of the endpoint
             * @param listener listener to use
             * @return updated builder
             */
            public Builder endpoint (String path, WsListener listener) {
                return route (WebSocket.create (path, listener) ) ;
            }
            /**
             * Add endpoint.
             * @param path path of the endpoint
             * @param listener listener supplier
             * @return updated builder
             */
            public Builder endpoint (String path, Supplier<WsListener
                >listener) {
                return route (WebSocket.create (path, listener) ) ;
            }
            private Builder route (WebSocket wsRoute) {
                routes.add (wsRoute) ;
                return this;
            }
    }
}
```

In accordance with an embodiment, the above uses a WsListener (WsListener) class, to configure WebSocket endpoints, for example:

```
public interface WsListener {
    /**
     * Receive text fragment.
     * @param session WebSocket session
     * @param text text received
     * @param last is this last fragment
     */
    void onMessage (WsSession session, String text, boolean last;
    /**
     * Receive binary fragment.
     * @param session WebSocket session
     * @param buffer buffer with data
     * @param last is this last fragment
     */
    void onMessage (WsSession session, BufferData buffer, boolean last;
    /**
```

```
 * Received ping.
 * @param session WebSocket session
 * @param buffer buffer with data
 */
void onPing (WsSession session, BufferData buffer) ;
/**
 * Received pong.
 * @param session WebSocket session
 * @param buffer buffer with data
 */
void onPong (WsSession session, BufferData buffer) ;
/**
 * Received close.
 * @param session WebSocket session
 * @param status close status
 * @param reason reason of close
 */
void onClose (WsSession session, int status, String reason) ;
/**
 * Error occurred.
 * @param session WebSocket session
 * @param t throwable caught
 */
void onError (WsSession session, Throwable t) ;
/**
 * Session is open.
 * @param session WebSocket session
 */
void onOpen (WsSession session) ;
}
```

In accordance with an embodiment, a gRPC routing implementation (GrpcRouting), providing a gRPC-specific routing, can be provided as, for example:

```
public class GrpcRouting implements Routing {
   private final ArrayList<GrpcRoute> routes;
   private GrpcRouting (Builder builder) {
      this.routes = new ArrayList<> (builder.routes) ;
   }
   /**
    * New routing builder.
    * @return new builder
    */
   public static Builder builder ( ) {
      return new Builder ( ) ;
   }
   Grpc<? , ?> findRoute (HttpPrologue prologue) {
      for (GrpcRoute route : routes) {
         PathMatchers.MatchResult accepts = route.accepts (prologue) ;
         if (accepts.accepted ( ) )
            return route.toGrpc (prologue) ;
      }
      return null;
   }
   /**
    * Fluent API builder for {GrpcRouting} .
    */
   public static class Builder implements common.Builder<Builder,
   GrpcRouting> {
      private final List<GrpcRoute> routes = new LinkedList<> ( ) ;
      private Builder ( ) {
      }
      @override
      public GrpcRouting build ( ) {
         return new GrpcRouting (this) ;
      }
      /**
       * Configure grpc service.
       * @param service service to add
       * @return updated builder
       */
      public Builder service (GrpcService service) {
         return route (GrpcServiceRoute.create (service) ) ;
      }
      /**
```

```
 * Unary route.
 * @param proto proto descriptor
 * @param serviceName service name
 * @param methodName method name
 * @param method method to handle this route
 * @param <ReqT> request type
 * @param <ResT> response type
 * @return updated builder
 */
public <ReqT, ResT> Builder unary (Descriptors.FileDescriptor
proto,
   String serviceName, String methodName,
   ServerCalls.UnaryMethod<ReqT, ResT> method) {
return route (Grpc.unary (proto, serviceName, methodName,
   method) ) ;
}
/**
 * Bidirectional route.
 * @param proto proto descriptor
 * @param serviceName service name
 * @param methodName method name
 * @param method method to handle this route
 * @param <ReqT> request type
 * @param <ResT> response type
 * @return updated builder
 */
public <ReqT, ResT> Builder bidi (Descriptors.FileDescriptor proto,
   String serviceName, String methodName,
   ServerCalls.BidiStreamingMethod<ReqT, ResT> method) {
return route (Grpc.bidi (proto, serviceName, methodName,
   method) ) ;
}
/**
 * Server streaming route.
 * @param proto proto descriptor
 * @param serviceName service name
 * @param methodName method name
 * @param method method to handle this route
 * @param <ReqT> request type
 * @param <ResT> response type
 * @return updated builder
 */
public <ReqT, ResT> Builder serverStream (Descriptors.
FileDescriptor proto,
   String serviceName, String methodName,
   ServerCalls.ServerStreamingMethod<ReqT, ResT>
   method) {
return route (Grpc.serverStream (proto, serviceName,
   methodName, method) ) ;
}
/**
 * Client streaming route.
 * @param proto proto descriptor
 * @param serviceName service name
 * @param methodName method name
 * @param method method to handle this route
 * @param <ReqT> request type
 * @param <ResT> response type
 * @return updated builder
 */
public <ReqT, ResT> Builder clientStream (Descriptors.
FileDescriptor proto,
   String serviceName, String methodName,
   ServerCalls.ClientStreamingMethod<ReqT, ResT>
   method) {
return route (Grpc.clientStream (proto, serviceName,
   methodName, method) ) ;
}
private Builder route (GrpcRoute route) {
   routes.add (route) ;
   return this;
}
}
}
```

In accordance with an embodiment, a gRPC Service (GrpcService) can be provided, as a single gRPC service that is backed by a single proto file, for example:

```
public interface GrpcService {
  /**
   * Proto descriptor of this service.
   * @return proto file descriptor
   */
  Descriptors.FileDescriptor proto ( ) ;
  /**
   * Service name, defaults to this class simple name.
   * @return service name
   */
  default String serviceName ( ) {
    return getClass ( ) .getSimpleName ( ) ;
  }
  /**
   * Update routing.
   * @param routing routing
   /*
  void update (Routing routing) ;
  /**
   * Service specific routing (proto descriptor is provided by
   * { GrpcService#proto ( ) } .
   */
  interface Routing {
    /**
     * Unary route.
     * @param methodName method name
     * @param method method to handle the route
     * @param <ReqT> request type
     * @param <ResT> response type
     * @return updated routing
     */
    <ReqT, ResT> Routing unary (String methodName,
      ServerCalls.UnaryMethod<ReqT, ResT> method) ;
    /**
     * Bidirectional route.
     * @param methodName method name
     * @param method method to handle the route
     * @param <ReqT> request type
     * @param <ResT> response type
     * @return updated routing
     */
    <ReqT, ResT> Routing bidi (String methodName,
      ServerCalls.BidiStreamingMethod<ReqT, ResT> method) ;
    /**
     * Server streaming route.
     * @param methodName method name
     * @param method method to handle the route
     * @param <ReqT> request type
     * @param <ResT> response type
     * @return updated routing
     */
    <ReqT, ResT> Routing serverStream (String methodName,
      ServerCalls.ServerStreamingMethod<ReqT, ResT> method) ;
    /**
     * Client streaming route.
     * @param methodName method name
     * @param method method to handle the route
     * @param <ReqT> request type
     * @param <ResT> response type
     * @return updated routing
     */
    <ReqT, ResT> Routing clientStream (String methodName,
      ServerCalls.ClientStreamingMethod<ReqT, ResT> method) ;
  }
}
```

The above examples are provided for purposes of illustration; in accordance with various embodiments other examples of interfaces, classes, or methods, can be provided.

Figure 23:
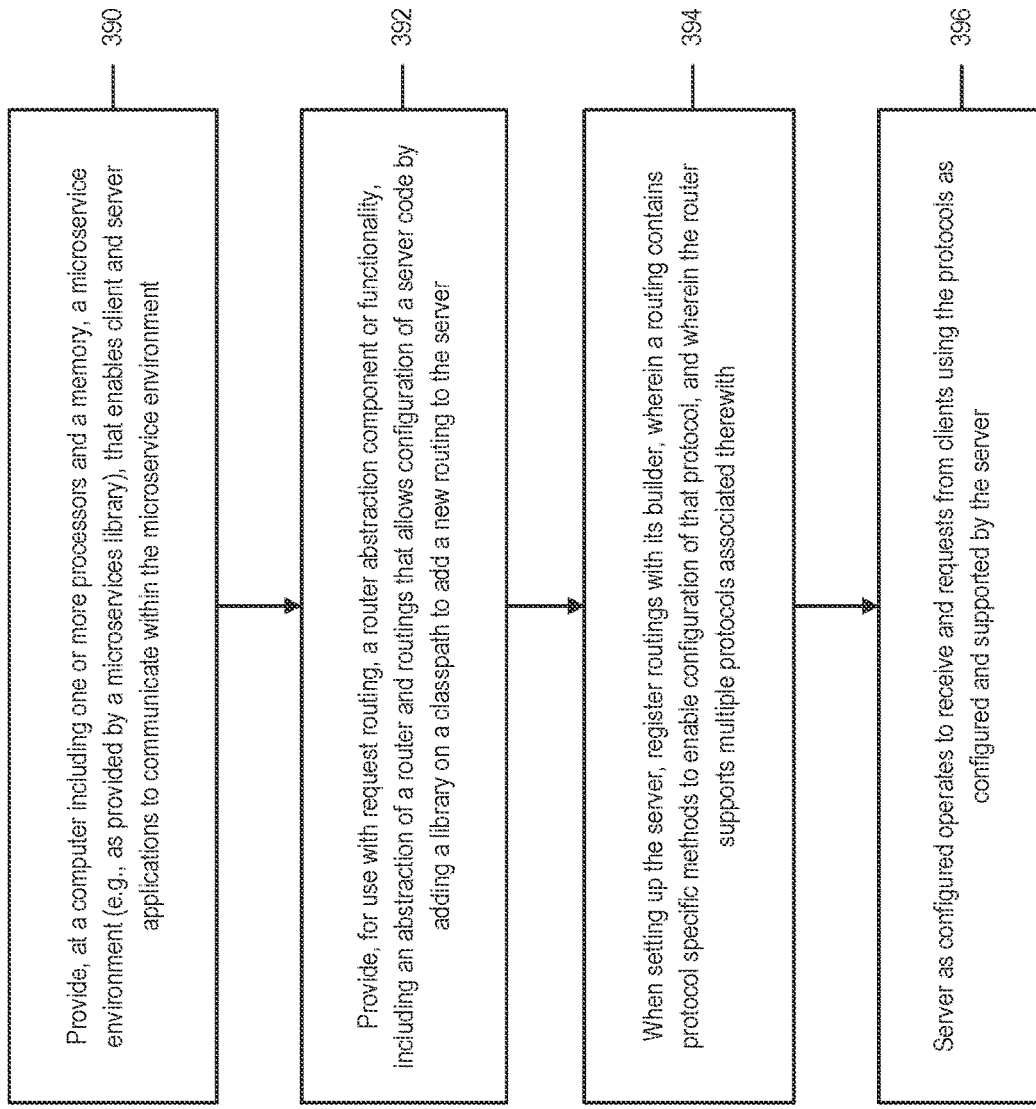
FIG. 23 illustrates a method for use with a microservice environment, for providing router abstraction, in accordance with an embodiment.

FIG. 23 illustrates a method for use with a microservice environment, for providing router abstraction, in accordance with an embodiment.

As illustrated in FIG. 23, in accordance with an embodiment, at step 390, at a computer including one or more processors and a memory, a microservice environment (e.g., as provided by a microservices library) is provided, that enables client and server applications to communicate within the microservice environment.

At step 392, the system provides, for use with, e.g., HTTP, request routing, a router abstraction component or functionality, including an abstraction of a router and routings that allow configuration of a server code by adding a library on a classpath to add a new routing to the server.

At step 394, when setting up the server, the server can register routings with its builder, wherein a routing contains protocol-specific methods to enable configuration of that protocol, and wherein the router supports multiple protocols associated therewith.

At step 396, the server as configured operates to receive and request from clients using the protocols as configured and supported by the server.

Example Interface

In accordance with an embodiment, provided below for purposes of illustration is an example interface for providing router abstraction. In accordance with other embodiments, other types of interface can be provided.

Interface Router

In accordance with an embodiment, a router (Router) interface can be used to provide routings of various types, so that the server can handle each protocol expeditiously, and can include various methods, for example:

A method static Router. Builder builder( ) Builder for router. In an embodiment, the method returns: a new builder.

A method static Router empty( ) Empty router. In an embodiment, the method returns: a new empty router.

A method routing<T extends Routing>T routing (Class<T>routingType, T defaultValue). Get routing of a specific type. Type Parameters that can be provided include, for example: T—type of routing. Parameters that can be provided include, for example: routingType—type of the routing; defaultValue—default value to use if the routing is not defined in this router. In an embodiment, the method returns: a routing defined or default value if not found.

D. Identifying a Protocol of a Connection

Within a cloud environment that supports client-server communications via different communication protocols, each communication protocol may have its own requirements as to the formatting of messages passed between the participants, including message headers.

For example, the HTTP/1 and HTTP/2 protocols have different requirements as to the format of message headers used when sending request or response messages via those protocols.

In accordance with an embodiment, to support features such as client/server connection abstraction, router abstraction, or the use of different protocols on a single socket, an extensible service provider interface (SPI) provides software methods that allow protocol identification for a request message and connection.

When a connection request message is received from a client directed to a server, a determination is made as to whether the request can be appropriately handled. The protocol identification process can, for example, return an indication that the system does not support the request protocol, that it does not have enough data to make a decision, or that additional data is needed to make such a determination.

For example, in some systems, when a server receives a connection request, it may not be possible to know what type of connection is being requested. As described herein the approach allows having a single server socket that serves different types of connections. Usually a different socket must be used for incompatible connection types. For HTTP/2, some servers may only support an upgrade from HTTP/1, or map the prior knowledge request to some special HTTP/1 request.

Figure 24:
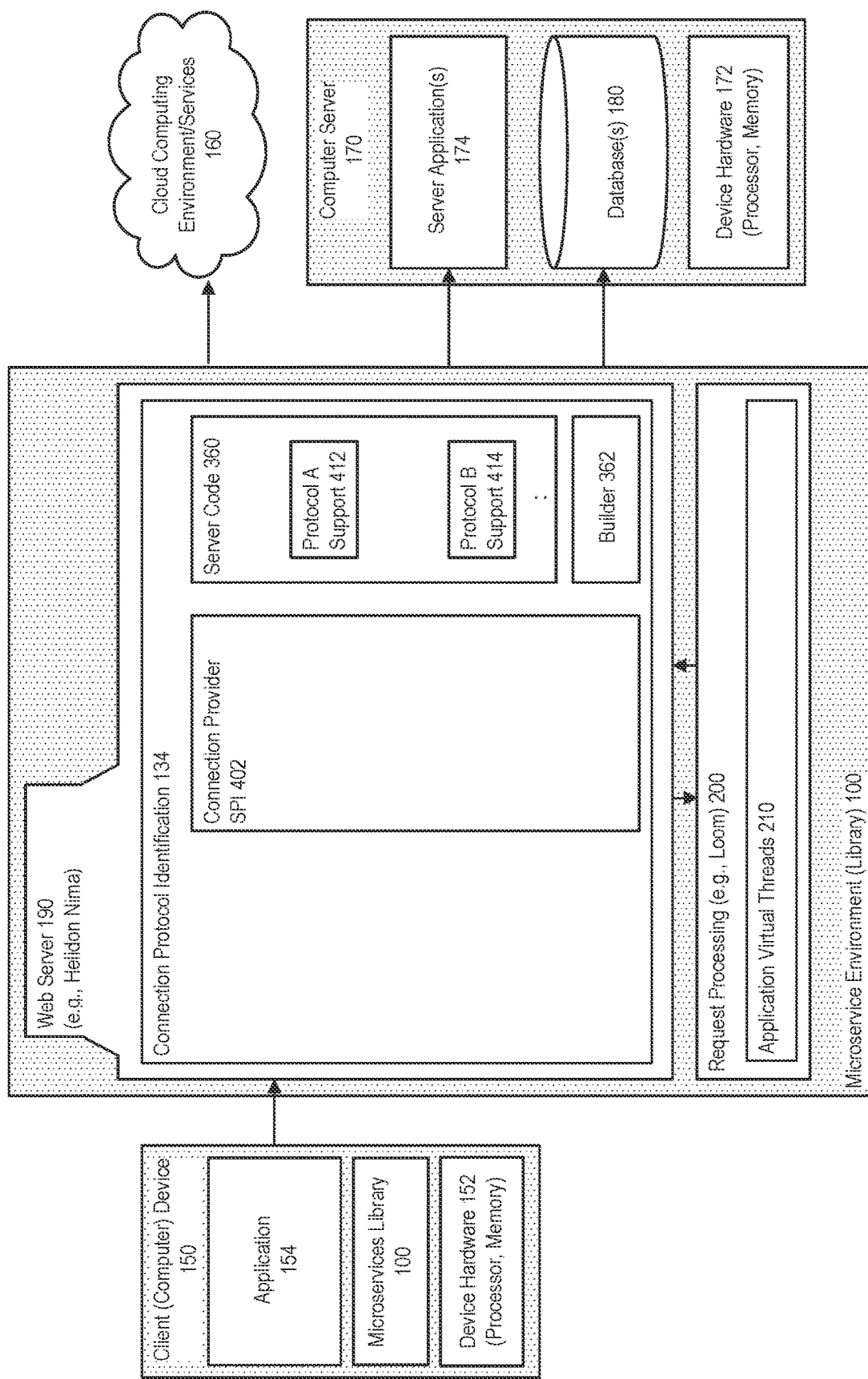
FIG. 24 illustrates support for identifying a protocol of a connection, in accordance with an embodiment.

The described approach enables calling a server with whichever protocol is supported and the server will automatically determine if it can accept it or not FIG. 24 illustrates support for identifying a protocol of a connection, in accordance with an embodiment.

As illustrated in FIG. 24, in accordance with an embodiment, to support features such as client/server connection abstraction, router abstraction, or the use of different protocols on a single socket, an extensible service provider interface (SPI) 402 provides software methods that allow protocol identification for a request message and connection.

In accordance with an embodiment, a builder can provide protocol support within the server code for a first protocol A 412, and a second protocol B 414.

When a connection request message is received from a client directed to a server, a determination is made as to whether the request can be appropriately handled. The protocol identification process can, for example, return an indication that the system does not support the request protocol, that it does not have enough data to make a decision, or that additional data is needed to make such a determination.

Figure 25:
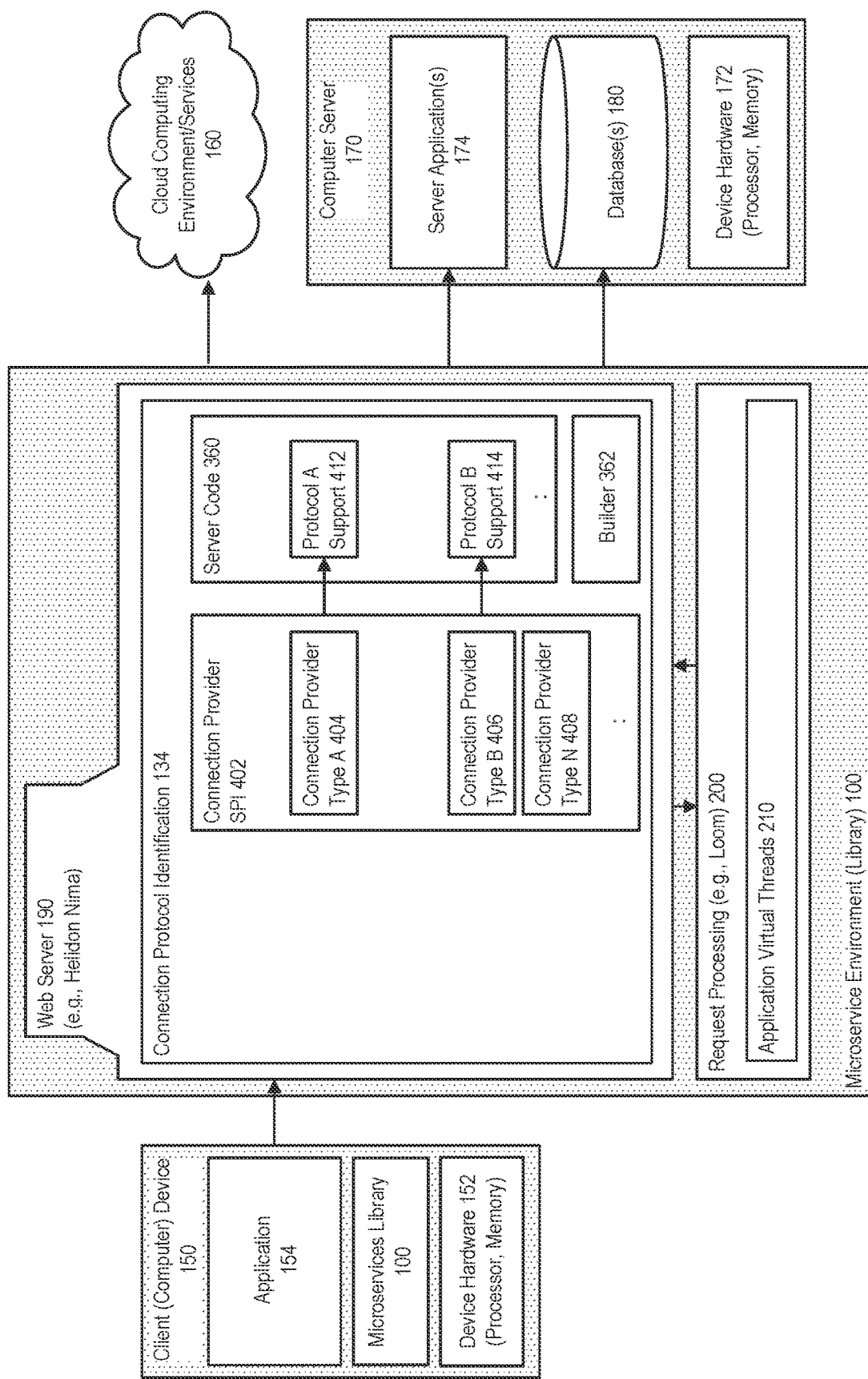
FIG. 25 further illustrates support for identifying a protocol of a connection, in accordance with an embodiment.

FIG. 25 further illustrates support for identifying a protocol of a connection, in accordance with an embodiment.

As illustrated in FIG. 25, in accordance with an embodiment, the extensible service provider interface (SPI) 402 can identify the protocol for a request message and connection, for example in having a first connection provider 404 associated with a first protocol A, a second connection provider 406 associated with a second protocol B, and in this example a third connection provider 408 associated with a third or other protocol N which may not be presently supported by the server.

Figure 26:
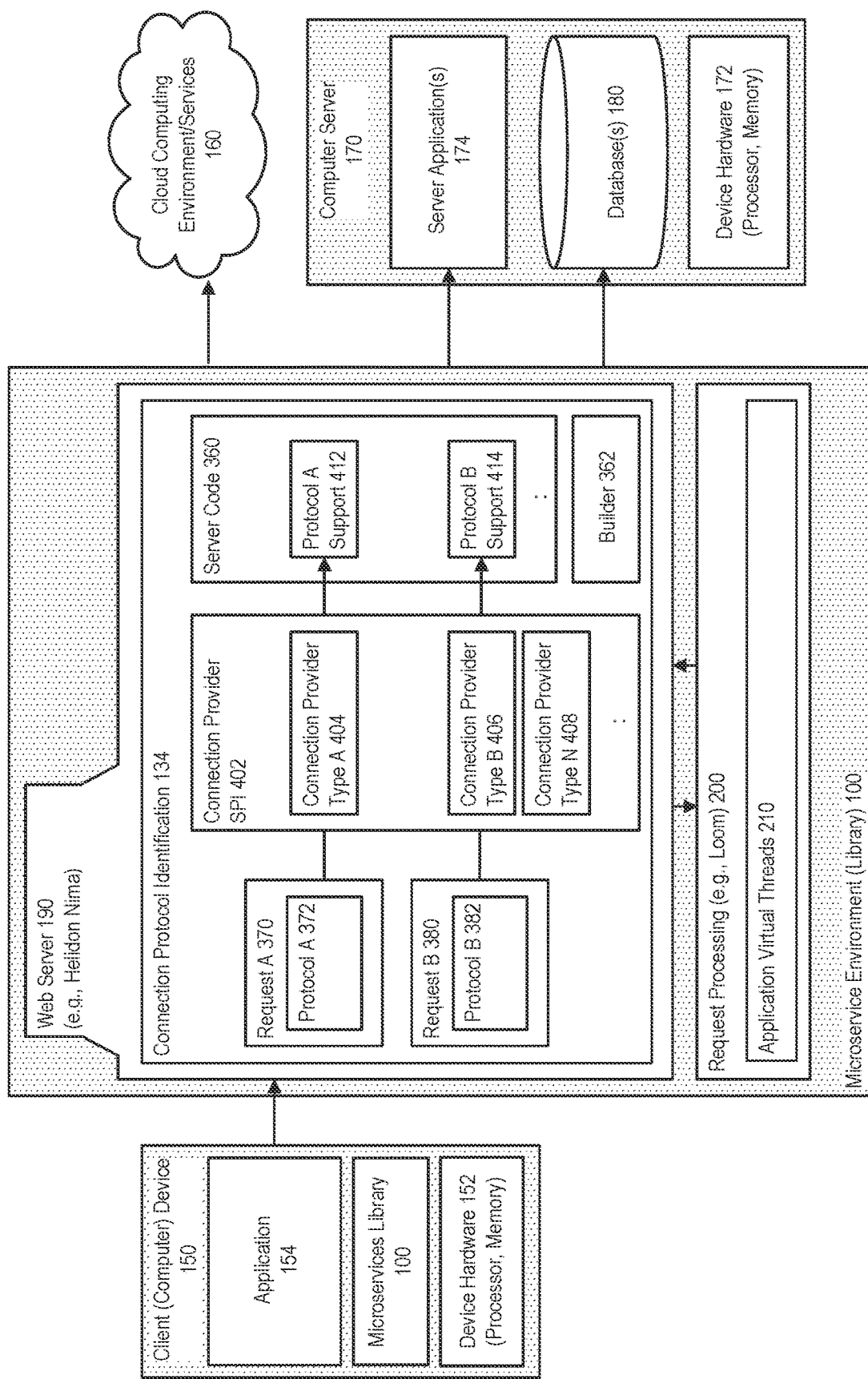
FIG. 26 further illustrates support for identifying a protocol of a connection, in accordance with an embodiment.

FIG. 26 further illustrates support for identifying a protocol of a connection, in accordance with an embodiment.

As illustrated in FIG. 26, in accordance with an embodiment, a request A 370 for a connection using the first protocol A 372; and a request B 380 for a connection using the second protocol B 382, can be processed by the appropriate server code.

Figure 27:
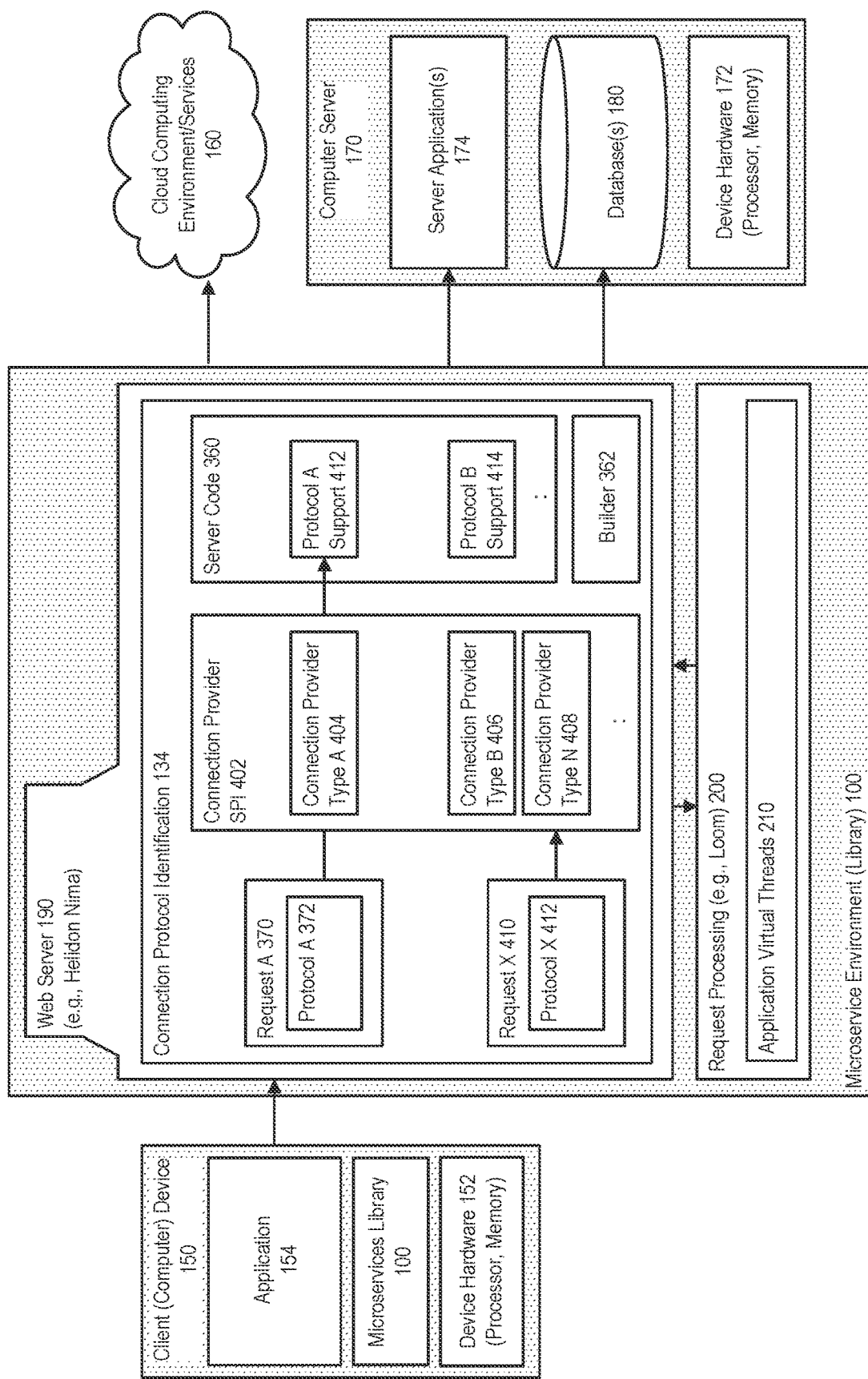
FIG. 27 further illustrates support for identifying a protocol of a connection, in accordance with an embodiment.

FIG. 27 further illustrates support for identifying a protocol of a connection, in accordance with an embodiment.

As illustrated in FIG. 27, in accordance with an embodiment, a request X 410 for a connection using an unknown other protocol X 412 is determined as not being supported by the server, and the SPI can determine whether to accept the connection request and handle it in some manner, or not accept the connection request.

In accordance with an embodiment, the system can use an extensible mechanism to identify the type of incoming connection to correctly handle it. The SPI can use the initial bytes of an incoming connection to identify what kind of connection it is (such as HTTP/1, HTTP/2 with prior knowledge). This mechanism uses a first amount of bytes (configurable by each protocol handler) to attempt an identification. If identification fails, the connection is not accepted.

Example Service Provider Interface

In accordance with an embodiment, the SPI implementation having a HTTP/1.1 connection provider uses bytes until the first CRLF sequence, tries to parse it and if it forms a valid HTTP/1.1 prologue (e.g. GET/path HTTP/1.1), it is accepted as an HTTP/1.1 request.

In accordance with an embodiment, the SPI implementation having a HTTP/2.2 connection provider uses a fixed number of bytes that form the connection preface defined by specification.

This approach is extensible, such that other connection providers can plug into this mechanism, to provide support for other protocols.

In accordance with an embodiment, an SPI and API can be provided as a server connection provider (ServerConnectionProvider), and can provide various interfaces, classes, or methods, for example:

A method int bytesToIdentifyConnection( )— how many bytes are needed (can be 0 to identify "unknown").

A method Support supports (BufferData data)—BufferData is an abstraction of initial bytes of the connection. Support defines whether this is a valid request for this provider, whether more data is needed to identify, or whether this is an invalid request for this provider.

A method ServerConnection connection (ConnectionContext)— create a server connection for a connection accepted by this provider, context provides access to reader and writer.

A method SupportedApplicationProtocols( ), used with protocol negotiation when using TLS.

In accordance with an embodiment, a java.util.ServiceLoader provider interface for server connection providers, wherein a Connection provider is given a chance to analyze request bytes and decide whether this is a connection it can accept, can be provided as, for example:

```
public interface ServerConnectionProvider {
    /**
    * How many bytes are needed to identify this connection.
    * @return number of bytes needed, return 0 if this is not a fixed value
    */
    int bytesToIdentifyConnection ( ) ;
    /**
    * Does this provider support current server connection.
    * The same buffer will be sent to {ServerConnection#handle ( ) }
    * @param data bytes (with available bytes of at least
    * {#bytesToIdentifyConnection ( ) } )
    * @return support response
    */
    Support supports (BufferData data);
    /**
    * Application protocols supported by this provider, used for example
    * for ALPN negotiation.
    * @return set of supported protocols
    */
    Set<String> supportedApplicationProtocols ( );
    /**
    * Create a new connection.
    * All methods will be invoked from a SINGLE virtual thread.
    * @param ctx connection context with access to the data writer, data
    * reader and other useful information
    * @return a new server connection
    */
    ServerConnection connection (ConnectionContext ctx);
    /**
    * Support by this provider.
    */
    enum Support {
        /**
        * Yes, this is a connection this provider can handle.
        */
        SUPPORTED,
        /**
        * No, this connection is not compatible with this provider.
        */
        UNSUPPORTED,
```

```
/**
 * We do not have enough bytes to decide, please ask this provider
 * again with more bytes.
 */
UNKNOWN
    }
}
```

In accordance with an embodiment, an SPI for server connections (ServerConnection) can be provided, which can be created by ServerConnectionProvider, and has a single method handle( ) that is expected to block until the connection is closed, for example as a Server connection abstraction, and which can be used by any provider to handle a socket connection, for example:

```
public interface ServerConnection {
    /**
     * Start handling the connection. Data is provided through
     * { ServerConnectionProvider#connection
     (webserver.ConnectionContext) } .
     * @throws InterruptedException to interrupt any waiting state
     and
     * terminate this connection
     */
    void handle ( ) throws InterruptedException;
```

In accordance with an embodiment, an HTTP/1 server connection provider (Http1ConnectionProvider) can be provided as, for example, a (java.util.ServiceLoader) provider implementation for an HTTP/1.1 server connection provider:

```
public class Http1ConnectionProvider implements ServerConnectionProvider {
    private static final String PROTOCOL = " HTTP/1.1\r";
    private final int maxPrologueLength;
    private final int maxHeadersSize;
    private final boolean validateHeaders;
    private final boolean validatePath;
    private final Map<String, Http1UpgradeProvider> upgradeProviderMap;
    /**
     * Create a new instance with default configuration.
     * @deprecated to be used solely by {java.util.ServiceLoader}
     */
    @Deprecated
    public Http1ConnectionProvider ( ) {
        this (builder ( ) ) ;
    }
    private Http1ConnectionProvider (Builder builder) {
        this.maxPrologueLength = builder.maxPrologueLength;
        this.maxHeadersSize = builder.maxHeaderSize;
        this.validateHeaders = builder.validateHeaders;
        this.validatePath = builder.validatePath;
        this.upgradeProviderMap = builder.upgradeProviders ( ) ;
    }
    /**
     * Builder to set up this provider.
     * @return a new builder
     */
    public static Builder builder ( ) {
        return new Builder ( ) ;
    }
    @override
    public int bytesToIdentifyConnection ( ) {
        // the request must begin with a line terminated by \r\n, and
        // we do not know the length
        return 0;
    }
    @Override
    public Support supports (BufferData request) {
        // we are looking for first \n, if preceded by \r -> try if ours,
        // otherwise not supported
        /*
        > GET /loom/slow HTTP/1.1
        > Host: localhost:8080
        > User-Agent: curl/7.54.0
        > Accept: */*
         */
        int lf = request.indexOf (Bytes.LF_BYTE) ;
        if (lf == -1) {
            // in case we have reached the max prologue length, we just
            // consider this to be HTTP/1.1 so we can send
            // proper error. This means that maxPrologueLength should always
            // be higher than any protocol requirements to
            // identify a connection (e.g. this is the fallback protocol)
            return (request.available ( ) <= maxPrologueLength) ?
                Support.SUPPORTED : Support.UNSUPPORTED;
        } else {
            return request.readString (lf) .endsWith (PROTOCOL) ?
            Support.SUPPORTED : Support.UNSUPPORTED;
        }
    }
    @Override
```

```
public Set<String> supportedApplicationProtocols ( ) {
   return Set.of("http/1.1") ;
}
@override
public ServerConnection connection (ConnectionContext ctx) {
   return new Http1Connection (ctx, maxPrologueLength,
      maxHeadersSize, validateHeaders, validatePath, upgradeProviderMap) ;
}
/**
 * Fluent API builder for {io.webserver.http1.Http1ConnectionProvider} .
 */
public static class Builder implements common.Builder<Builder,
Http1ConnectionProvider> {
 private final HelidonServiceLoader. Builder<Http1UpgradeProvider>
 upgrade Providers =
 HelidonServiceLoader.builder (ServiceLoader.load(Http1UpgradeProvider.class)
) ;
   private int maxPrologueLength = DEFAULT_MAX_PROLOGUE_LENGTH;
   private int maxHeaderSize = DEFAULT_MAX_HEADERS_SIZE;
   private boolean validateHeaders = DEFAULT_VALIDATE_HEADERS;
   private boolean validatePath = DEFAULT_VALIDATE_PATH;
   private Builder ( ) {
}
   @Override
   public Http1ConnectionProvider build ( ) {
      return new Http1ConnectionProvider (this) ;
}
/**
  * Maximal size of received HTTP prologue (GET /path HTTP/1.1) .
  * @param maxPrologueLength maximal size in bytes
  * @return updated builder
  */
   public Builder maxPrologueLength (int maxPrologueLength) {
      this.maxPrologueLength = maxPrologueLength;
      return this;
}
/ **
  * Maximal size of received headers in bytes.
  * @param maxHeadersSize maximal header size
  * @return updated builder
  */
   public Builder maxHeadersSize (int maxHeadersSize) {
      this.maxHeaderSize = maxHeadersSize;
      return this;
}
/**
  * Whether to validate headers.
  * If set to false, any value is accepted, otherwise validates
  * headers + known headers
  * are validated by format
  * (content length is always validated as it is part of protocol
  * processing (other headers may be validated if
  * features use them) ) .
  *
  * @param validateHeaders whether to validate headers
  * @return updated builder
  */
   public Builder validateHeaders (boolean validateHeaders) {
      this.validateHeaders = validateHeaders;
      return this;
}
/**
  * If set to false, any path is accepted (even containing
  * illegal characters) .
  * @param validatePath whether to validate path
  * @return updated builder
  */
   public Builder validatePath (boolean validatePath) {
      this.validatePath = validatePath;
      return this;
}
/**
  * Add a configured upgrade provider. This will replace the instance
  * discovered through service loader (if one exists) .
  * @param provider add a provider
  * @return updated builder
  */
   public Builder addUpgradeProvider (Http1UpgradeProvider provider) {
      upgradeProviders.addService (provider) ;
```

-continued

```
      return this;
    }
  }
}
```

In accordance with an embodiment, an HTTP/2 server connection provider (Http2ConnectionProvider) can be provided, to support "prior knowledge" requests, for example:

```
/**
 * {java.util.ServiceLoader} provider implementation for
 * HTTP/2 server connection provider.
 */
public class Http2ConnectionProvider implements
ServerConnectionProvider {
  @Override
  public int bytesToIdentifyConnection ( ) {
    return PREFACE_LENGTH;
  }
  @override
  public Support supports (BufferData request) {
    byte [ ] prefaceBytes = new byte [PREFACE_LENGTH] ;
    request.read (prefaceBytes, 0, PREFACE_LENGTH) ;
    // now we can ask protocol handler to identify this protocol
      if (isPreface (prefaceBytes) ) {
      // this is HTTP/2 prior knowledge
      return Support.SUPPORTED;
    }
    return Support.UNSUPPORTED;
  }
  @Override
  public Set<String> supportedApplicationProtocols ( ) {
    return Set.of ("h2") ;
  }
  @override
  public ServerConnection connection (ConnectionContext ctx) {
    Http2Connection result = new Http2Connection (ctx) ;
    result.expectPreface ( ) ;
    return result;
  }
}
```

The above examples are provided for purposes of illustration; in accordance with various embodiments other examples of interfaces, classes, or methods, can be provided.

Figure 28:
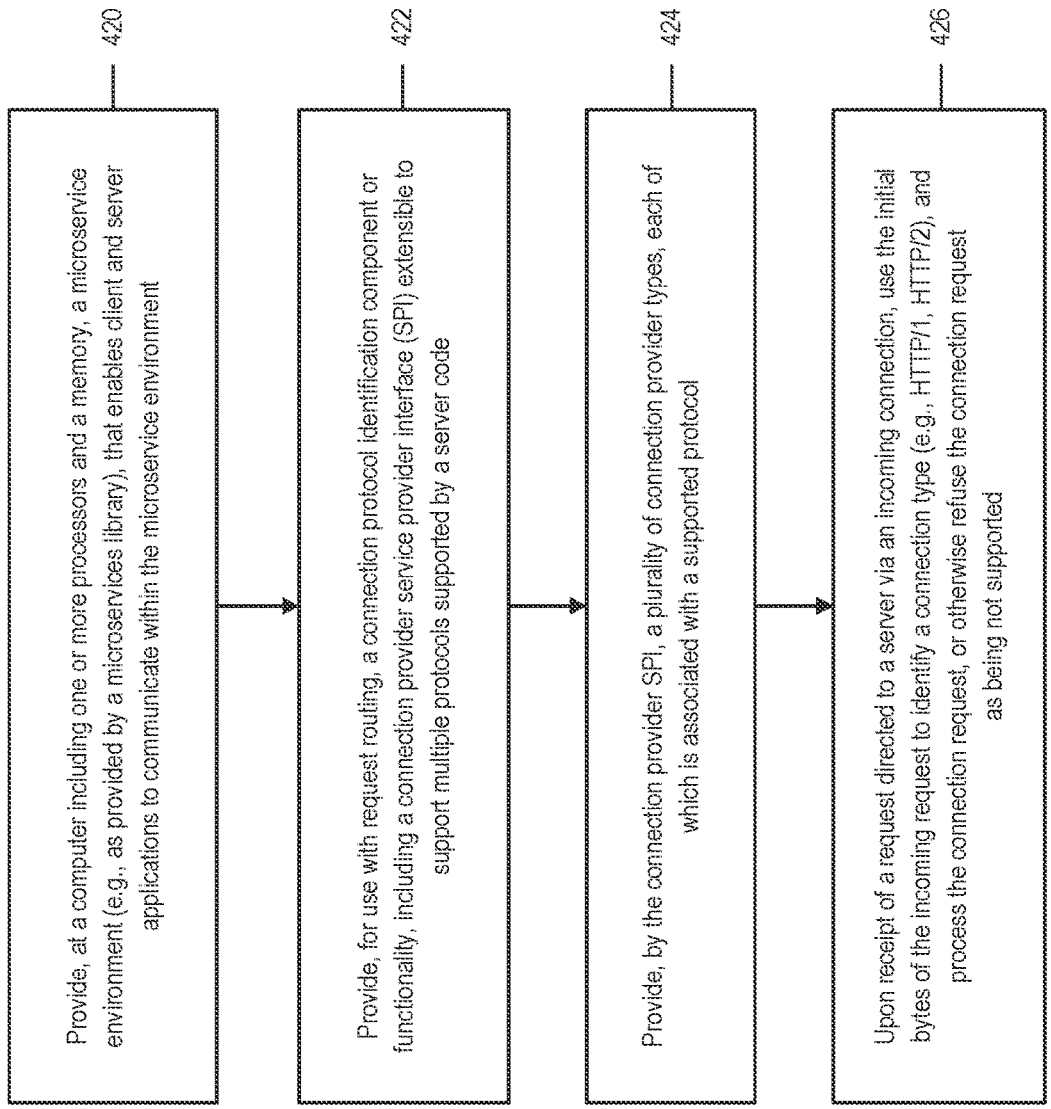
FIG. 28 illustrates a method for use with a microservice environment, for identifying a protocol of a connection, in accordance with an embodiment.

FIG. 28 illustrates a method for use with a microservice environment, for identifying a protocol of a connection, in accordance with an embodiment.

As illustrated in FIG. 28, in accordance with an embodiment, at step 420, at a computer including one or more processors and a memory, a microservice environment (e.g., as provided by a microservices library) is provided, that enables client and server applications to communicate within the microservice environment.

At step 422, the system provides, for use with, e.g., HTTP, request routing, a connection protocol identification component or functionality, including a connection provider service provider interface (SPI) extensible to support multiple protocols supported by a server code.

At step 424, the connection provider SPI provides a plurality of connection provider types, each of which is associated with a supported protocol.

At step 426, upon receipt of a request directed to a server via an incoming connection, the system can use the initial bytes of the incoming request to identify a connection type (e.g., HTTP/1, HTTP/2), and process the connection request, or otherwise refuse the connection request as being not supported.

Example Interface

In accordance with an embodiment, provided below for purposes of illustration is an example interface for identifying a protocol of a connection. In accordance with other embodiments, other types of interface can be provided.

Interface ServerConnectionProvider

In accordance with an embodiment, a ServerConnectionProvider interface can be used to provide an interface for server connection providers, wherein a connection provider is given a chance to analyze request bytes and decide whether this is a connection it can accept, and can include various methods, for example:

A method int bytesToIdentifyConnection( ). How many bytes are needed to identify this connection. In an embodiment, the method returns: a number of bytes needed, return 0 if this is not a fixed value.

A method ServerConnectionProvider.Support supports (common.buffers.BufferData data). Does this provider support current server connection. The same buffer will be sent to ServerConnection.handle( ). Parameters that can be provided include, for example: data-bytes (with available bytes of at least bytesToIdentifyConnectionQ). In an embodiment, the method returns: a support response.

A method Set<String>supportedApplicationProtocols( ) Application protocols supported by this provider, used for example for ALPN negotiation. In an embodiment, the method returns: a set of supported protocols.

A method ServerConnection connection (ConnectionContext ctx). Create a new connection. All methods will be invoked from a single virtual thread. Parameters that can be provided include, for example: ctx—connection context with access to the data writer, data reader and other useful information. In an embodiment, the method returns: a new server connection.

In accordance with various embodiments, the teachings herein may be conveniently implemented using one or more conventional general purpose or specialized computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the teachings herein can include a computer program product which is a non-transitory computer readable storage medium (media) having instructions stored thereon/in which can be used to program a computer to perform any of the processes of the present teachings. Examples of such storage mediums can include, but are not limited to, hard disk drives, hard disks, hard drives, fixed disks, or other electromechanical data storage devices, floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems, or other types of storage media or devices suitable for non-transitory storage of instructions and/or data.

The foregoing description has been provided for the purposes of illustration and description. It is not intended to be exhaustive or to limit the scope of protection to the precise forms disclosed. Many modifications and variations will be apparent to the practitioner skilled in the art.

For example, although various embodiments of the systems and methods described herein illustrate usage in a Helidon microservice environment, various embodiments can be used with other types of microservice environments or other computing environments.

The embodiments were chosen and described in order to best explain the principles of the present teachings and their practical application, thereby enabling others skilled in the art to understand the various embodiments and with various modifications that are suited to the particular use contemplated. It is intended that the scope be defined by the following claims and their equivalents.

What is claimed is:

1. A system for use with a microservices or other computing environment, comprising:
   a computer including one or more processors, that provides access to a microservices or other computing environment for use with software applications or services; and
   wherein during testing of software applications or services, a client connection is replaced with an in-memory implementation that emulates use of a network communication protocol and exposes inverse functions to a server connection, including that:
      data written to a data writer of the client connection is made available through a data reader on the server connection, and
      data written to a data writer of the server connection is made available through a data reader on the client connection.

2. The system of claim 1, wherein the in-memory implementation uses a blocking queue in memory, which emulates use of the network communication protocol without using actual sockets, wherein the testing has been completed, client and/or server code can be implemented against actual sockets.

3. The system of claim 2, wherein the system is provided as part of or for use with a web server that processes requests directed from a client to a server, and wherein the requests are hypertext transfer protocol (HTTP) requests.

4. The system of claim 3, wherein the system includes a request processing component that uses virtual threads, together with related libraries and features usable to build a cloud native service.

5. The system of claim 4, wherein the system is provided within a cloud computing environment that provides access to one or more cloud, database, or other systems or services.

6. A method for use with a microservices or other computing environment, comprising:
   providing a microservices or other computing environment for use with software applications or services; and
   during testing of software applications or services, replacing a client connection with an in-memory implementation that emulates use of a network communication protocol and exposes inverse functions to a server connection, including that:
      data written to a data writer of the client connection is made available through a data reader on the server connection, and
      data written to a data writer of the server connection is made available through a data reader on the client connection.

7. The method of claim 6, wherein the in-memory implementation uses a blocking queue in memory, which emulates use of the network communication protocol without using actual sockets, wherein the testing has been completed, client and/or server code can be implemented against actual sockets.

8. The method of claim 7, wherein the method is provided as part of or for use with a web server that processes requests directed from a client to a server, and wherein the requests are HTTP requests.

9. The method of claim 8, wherein the method operates with a request processing component that uses virtual threads, together with related libraries and features usable to build a cloud native service.

10. The method of claim 9, wherein the method operates within a cloud computing environment that provides access to one or more cloud, database, or other systems or services.

11. A non-transitory computer readable storage medium, including instructions stored thereon which when read and executed by one or more computers cause the one or more computers to perform a method comprising:
    providing a microservices or other computing environment for use with software applications or services; and
    during testing of software applications or services, replacing a client connection with an in-memory implementation that emulates use of a network communication protocol and exposes inverse functions to a server connection, including that:
       data written to a data writer of the client connection is made available through a data reader on the server connection, and
       data written to a data writer of the server connection is made available through a data reader on the client connection.

12. The non-transitory computer readable storage medium of claim 11, wherein the in-memory implementation uses a blocking queue in memory, which emulates use of the network communication protocol without using actual sockets, wherein the testing has been completed, client and/or server code can be implemented against actual sockets.

13. The non-transitory computer readable storage medium of claim 12, wherein the method is provided as part of or for use with a web server that processes requests directed from a client to a server, and wherein the requests are HTTP requests.

14. The non-transitory computer readable storage medium of claim 13, wherein the method operates with a request processing component that uses virtual threads, together with related libraries and features usable to build a cloud native service.

15. The non-transitory computer readable storage medium of claim 14, the method operates within a cloud computing environment that provides access to one or more cloud, database, or other systems or services.

* * * * *

UNITED STATES PATENT AND TRADEMARK OFFICE
CERTIFICATE OF CORRECTION

PATENT NO. : 12,095,658 B2
APPLICATION NO. : 18/198762
DATED : September 17, 2024
INVENTOR(S) : Langer It is certified that error appears in the above-identified patent and that said Letters Patent is hereby corrected as shown below:

In the Specification

In Column 11, Line 47, delete "lowerCase( )" and insert -- lowerCase( ): --, therefor.

In Column 11, Line 58, delete "index( )" and insert -- index( ): --, therefor.

In Column 12, Line 56, delete "name( )" and insert -- name( ). --, therefor.

In Column 12, Line 63, delete "value( )" and insert -- value( ). --, therefor.

In Column 13, Line 8, delete "sensitive( )" and insert -- sensitive( ). --, therefor.

In Column 13, Line 11, delete "changing( )" and insert -- changing( ). --, therefor.

In Column 13, Line 15, delete "byte ☐" and insert -- byte[] --, therefor.

In Column 13, Line 18, delete "writeHttp1 Header" and insert -- writeHttp1Header --, therefor.

In Column 22, Line 57, delete "(the "l"" and insert -- (the "/" --, therefor.

In Column 36, Line 29, delete "builder( )" and insert -- builder( ). --, therefor.

In Column 36, Line 31, delete "empty( )" and insert -- empty( ). --, therefor.

In Column 37, Line 9, delete "not" and insert -- not. --, therefor.

In Column 44, Line 31, delete "ConnectionQ)." and insert -- Connection()). --, therefor.

In Column 44, Line 33, delete "Protocols( )" and insert -- Protocols( ). --, therefor.

Signed and Sealed this
Twenty-eighth Day of January, 2025

Coke Morgan Stewart
*Acting Director of the United States Patent and Trademark Office*